United States Patent
Tokuyama et al.

(10) Patent No.: US 9,415,835 B2
(45) Date of Patent: Aug. 16, 2016

(54) ROTATABLE ANNULAR BICYCLE COMPONENT AND BICYCLE REAR SPROCKET

(71) Applicant: SHIMANO INC., Sakai (JP)

(72) Inventors: Koji Tokuyama, Sakai (JP); Kazunori Okubo, Sakai (JP)

(73) Assignee: SHIMANO INC., Sakai (JP)

( * ) Notice: Subject to any disclaimer, the term of this patent is extended or adjusted under 35 U.S.C. 154(b) by 63 days.

(21) Appl. No.: 14/163,093

(22) Filed: Jan. 24, 2014

(65) Prior Publication Data

US 2015/0210353 A1    Jul. 30, 2015

(51) Int. Cl.
F16H 55/12    (2006.01)
F16H 55/30    (2006.01)
B62M 9/12     (2006.01)
B62M 9/121    (2010.01)

(52) U.S. Cl.
CPC . *B62M 9/12* (2013.01); *B62M 9/121* (2013.01)

(58) Field of Classification Search
CPC .......... B62M 9/10; B62M 9/105; B62M 9/12; F16H 55/30; F16H 55/12
USPC ...................................................... 474/160
See application file for complete search history.

(56) References Cited

U.S. PATENT DOCUMENTS

| | | | | | |
|---|---|---|---|---|---|
| 2,451,690 | A | * | 10/1948 | Oehler | 474/95 |
| 3,082,637 | A | * | 3/1963 | Paxton | 474/162 |
| 4,594,910 | A | * | 6/1986 | Nagano | 74/594.2 |
| 5,026,329 | A | * | 6/1991 | Diekevers | 474/162 |
| 6,428,437 | B1 | * | 8/2002 | Schlanger | 474/160 |
| 7,344,463 | B2 | * | 3/2008 | Reiter | 474/160 |
| 7,585,240 | B2 | * | 9/2009 | Kamada | 474/160 |
| 7,871,347 | B2 | * | 1/2011 | Kamada | 474/160 |
| 7,931,553 | B2 | * | 4/2011 | Tokuyama | 474/160 |
| 7,959,529 | B2 | * | 6/2011 | Braedt | 474/160 |
| 8,057,338 | B2 | * | 11/2011 | Kamada | 474/160 |
| 8,100,795 | B2 | * | 1/2012 | Reiter | 474/160 |
| 8,764,594 | B2 | * | 7/2014 | Dal Pra' et al. | 474/160 |
| 8,821,330 | B2 | * | 9/2014 | Dal Pra' et al. | 474/160 |
| 8,905,878 | B2 | * | 12/2014 | Loy et al. | 474/160 |
| 8,956,254 | B2 | * | 2/2015 | Tokuyama et al. | 474/160 |
| 9,033,835 | B2 | * | 5/2015 | Blank et al. | 474/152 |
| 2002/0086753 | A1 | * | 7/2002 | Yahata | 474/160 |
| 2003/0199351 | A1 | * | 10/2003 | Nichols | 474/160 |
| 2004/0009838 | A1 | * | 1/2004 | Valle | 474/160 |
| 2004/0070166 | A1 | * | 4/2004 | Valle | 280/260 |
| 2004/0092352 | A1 | * | 5/2004 | Chiang | 474/160 |
| 2004/0121867 | A1 | * | 6/2004 | Reiter | 474/160 |
| 2006/0063624 | A1 | * | 3/2006 | Voss | 474/78 |

(Continued)

FOREIGN PATENT DOCUMENTS

TW    M389678 U    10/2010
TW    M393471 U    10/2010

*Primary Examiner* — Henry Liu
(74) *Attorney, Agent, or Firm* — Mori & Ward, LLP

(57) ABSTRACT

A rotatable annular bicycle component comprises an outer annular member, an intermediate supporting member, and a hub engaging member. The outer annular member comprises a first material. The outer annular member is attached to the intermediate supporting member. The intermediate supporting member comprises a second material different from the first material. The hub engaging member is configured to be attached to the intermediate supporting member and is configured to engage with a bicycle hub assembly. The hub engaging member comprises a third material different from the second material.

44 Claims, 22 Drawing Sheets

(56) References Cited

U.S. PATENT DOCUMENTS

| | | |
|---|---|---|
| 2006/0160647 A1* | 7/2006 | Swane .......................... 474/166 |
| 2006/0172840 A1* | 8/2006 | Kamada ........................ 474/152 |
| 2006/0205549 A1* | 9/2006 | Nonoshita et al. ............ 474/160 |
| 2007/0054770 A1* | 3/2007 | Valle ............................. 474/160 |
| 2007/0129193 A1* | 6/2007 | Nonoshita et al. ............ 474/160 |
| 2008/0161146 A1* | 7/2008 | Shiraishi et al. .............. 474/160 |
| 2008/0202284 A1* | 8/2008 | Valle et al. .................... 74/594.1 |
| 2009/0042679 A1* | 2/2009 | Valle ............................. 474/152 |
| 2009/0042682 A1* | 2/2009 | Dal Pra' et al. ............... 474/160 |
| 2009/0098966 A1* | 4/2009 | Kamada ........................ 474/160 |

* cited by examiner

ROTATABLE ANNULAR BICYCLE COMPONENT AND BICYCLE REAR SPROCKET

BACKGROUND OF THE INVENTION

1. Field of the Invention

The present invention relates to a rotatable annular bicycle component and a bicycle rear sprocket.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Most bicycles have rotatable annular bicycle components such as a bicycle sprocket or a disc rotor.

SUMMARY OF THE INVENTION

In accordance with a first aspect of the present invention, a rotatable annular bicycle component comprises an outer annular member, an intermediate supporting member, and a hub engaging member. The outer annular member comprises a first material. The outer annular member is attached to the intermediate supporting member. The intermediate supporting member comprises a second material different from the first material. The hub engaging member is configured to be attached to the intermediate supporting member and is configured to engage with a bicycle hub assembly. The hub engaging member comprises a third material different from the second material.

In accordance with a second aspect of the present invention, the rotatable annular bicycle component according to the first aspect is configured so that the outer annular member includes sprocket teeth configured to engage with a bicycle chain.

In accordance with a third aspect of the present invention, the rotatable annular bicycle component according to the second aspect further comprises at least one additional outer annular member including sprocket teeth configured to engage with a bicycle chain. The at least one additional outer annular member is attached to the intermediate supporting member.

In accordance with a fourth aspect of the present invention, the rotatable annular bicycle component according to the first aspect is configured so that the hub engaging member includes an annular main-body and an inner engaging part. The annular main-body is provided about a rotational center axis of the rotatable annular bicycle component. The inner engaging part is provided on an inner peripheral part of the annular main-body and includes a first concavo-convex structure configured to engage with a concavo-convex structure of the bicycle hub assembly.

In accordance with a fifth aspect of the present invention, the rotatable annular bicycle component according to the fourth aspect is configured so that the hub engaging member includes an outer engaging part provided on an outer peripheral part of the annular main-body and including a second concavo-convex structure configured to engage with the sprocket supporting member.

In accordance with a sixth aspect of the present invention, the rotatable annular bicycle component according to the fifth aspect is configured so that the intermediate supporting member includes a third concavo-convex structure configured to engage with the second concavo-convex structure of the hub engaging member.

In accordance with a seventh aspect of the present invention, the rotatable annular bicycle component according to the first aspect is configured so that the first material comprises a metallic material. The second material comprises a non-metallic material. The third material comprises a metallic material.

In accordance with an eighth aspect of the present invention, the rotatable annular bicycle component according to the first aspect is configured so that the second material comprises a resin material.

In accordance with a ninth aspect of the present invention, the rotatable annular bicycle component according to the first aspect is configured so that the second material comprises fiber reinforced plastic.

In accordance with a tenth aspect of the present invention, the rotatable annular bicycle component according to the first aspect is configured so that the third material comprises one of aluminum, iron and titanium.

In accordance with an eleventh aspect of the present invention, the rotatable annular bicycle component according to the first aspect is configured so that the first material comprises one of iron and titanium.

In accordance with a twelfth aspect of the present invention, the rotatable annular bicycle component according to the first aspect is configured so that the outer annular member has a multi-layered structure with different materials.

In accordance with a thirteenth aspect of the present invention, the rotatable annular bicycle component according to the twelfth aspect is configured so that the outer annular member includes a first sprocket layer, a second sprocket layer and a third sprocket layer. The first sprocket layer comprises the first material. The second sprocket layer comprises a fourth material. The third sprocket layer comprises a fifth material and is provided between the first sprocket layer and the second sprocket layer. The first material comprises a metallic material. The fourth material comprises a metallic material. The fifth material comprises a non-metallic material.

In accordance with a fourteenth aspect of the present invention, the rotatable annular bicycle component according to the thirteenth aspect is configured so that the fifth material comprises a resin material.

In accordance with a fifteenth aspect of the present invention, the rotatable annular bicycle component according to the fourteenth aspect is configured so that the second material and the fifth material comprise the resin material. The first sprocket layer, the second sprocket layer and the third sprocket layer are integrally formed with the sprocket supporting member.

In accordance with a sixteenth aspect of the present invention, the rotatable annular bicycle component according to the fifteenth aspect is configured so that the first sprocket layer, the second sprocket layer and the third sprocket layer are integrally formed with the intermediate supporting member by an integral molding process.

In accordance with a seventeenth aspect of the present invention, the rotatable annular bicycle component according to the thirteenth aspect further comprises an additional outer annular member including sprocket teeth configured to engage with a bicycle chain. The additional outer annular member has a multi-layered structure with different materials and includes a fourth sprocket layer, a fifth sprocket layer and a sixth sprocket layer. The fourth sprocket layer comprises a metallic material. The fifth sprocket layer comprises a metallic material. The sixth sprocket layer comprises a non-metallic material and is provided between the fourth sprocket layer and the fifth sprocket layer. The fourth sprocket layer is joined to the first sprocket layer by defused joining.

In accordance with an eighteenth aspect of the present invention, the rotatable annular bicycle component according to the twelfth aspect is configured so that the outer annular member includes a first sprocket layer, a second sprocket layer and a third sprocket layer. The first sprocket layer comprises the first material. The second sprocket layer comprises a fourth material. The third sprocket layer comprises a fifth material and is provided between the first sprocket layer and the second sprocket layer. The first sprocket layer is bonded to the third sprocket layer with adhesive. The second sprocket layer is bonded to the third sprocket layer with adhesive.

In accordance with a nineteenth aspect of the present invention, the rotatable annular bicycle component according to the twelfth aspect is configured so that the outer annular member includes a first sprocket layer, a second sprocket layer and a third sprocket layer. The first sprocket layer comprises the first material. The second sprocket layer comprises a fourth material. The third sprocket layer comprises a fifth material and is provided between the first sprocket layer and the second sprocket layer. Each of the first material, the fourth material and the fifth material comprise a metallic material. The first sprocket layer is joined to the third sprocket layer by defused joining. The second sprocket layer is joined to the third sprocket layer by defused joining.

In accordance with a twentieth aspect of the present invention, the rotatable annular bicycle component according to the first aspect is configured so that the intermediate supporting member includes a weight-saving opening.

In accordance with a twenty-first aspect of the present invention, the rotatable annular bicycle component according to the twentieth aspect is configured so that the intermediate supporting member includes a reinforcing rib at least partly overlapping with the weight-saving opening when viewed from an axial direction parallel to a rotational center axis of the rotatable annular bicycle component.

In accordance with a twenty-second aspect of the present invention, the rotatable annular bicycle component according to the twenty-first aspect is configured so that the reinforcing rib is at least partly provided outside the weight-saving opening in the axial direction.

In accordance with a twenty-third aspect of the present invention, the rotatable annular bicycle component according to the first aspect is configured so that the rotatable annular bicycle component comprises a disc rotor.

In accordance with a twenty-fourth aspect of the present invention, a bicycle rear sprocket comprises a sprocket member and a sprocket supporting member. The sprocket member includes sprocket teeth configured to engage with a bicycle chain. The sprocket member is attached to the sprocket supporting member. The sprocket supporting member comprises a weight-saving opening and a reinforcing rib at least partly overlapping with the weight-saving opening when viewed from an axial direction parallel to a rotational center axis of the bicycle rear sprocket.

In accordance with a twenty-fifth aspect of the present invention, the bicycle rear sprocket according to the twenty-fourth aspect is configured so that the reinforcing rib is at least partly provided outside the weight-saving opening in the axial direction.

In accordance with a twenty-sixth aspect of the present invention, the bicycle rear sprocket according to the twenty-fourth aspect is configured so that the reinforcing rib is entirely provided outside the weight-saving opening in the axial direction.

In accordance with a twenty-seventh aspect of the present invention, the bicycle rear sprocket according to the twenty-fourth aspect is configured so that the sprocket member comprises a first material. The sprocket supporting member comprises a second material. The first material comprises a metallic material. The second material comprises a non-metallic material.

In accordance with a twenty-eighth aspect of the present invention, the bicycle rear sprocket according to the twenty-seventh aspect is configured so that the second material comprises a resin material.

In accordance with a twenty-ninth aspect of the present invention, the bicycle rear sprocket according to the twenty-seventh aspect is configured so that the second material comprises fiber reinforced plastic.

In accordance with a thirtieth aspect of the present invention, the bicycle rear sprocket according to the twenty-fourth aspect further comprises a hub engaging member configured to be attached to the sprocket supporting member and configured to engage with a bicycle hub assembly. The hub engaging member comprises a third material. The third material comprises a metallic material.

In accordance with a thirty-first aspect of the present invention, the bicycle rear sprocket according to the thirtieth aspect is configured so that the third material comprises one of aluminum, iron, and titanium.

In accordance with a thirty-second aspect of the present invention, the bicycle rear sprocket according to the thirtieth aspect is configured so that the hub engaging member includes an annular main-body and an inner engaging part. The annular main-body is provided about the rotational center axis of the bicycle rear sprocket. The inner engaging part is provided on an inner peripheral part of the annular main-body and includes a first concavo-convex structure configured to engage with a concavo-convex structure of an bicycle hub assembly.

In accordance with a thirty-third aspect of the present invention, the bicycle rear sprocket according to the thirtieth aspect is configured so that the hub engaging member includes an outer engaging part provided on an outer peripheral part of the annular main-body and including a second concavo-convex structure configured to engage with the sprocket supporting member.

In accordance with a thirty-fourth aspect of the present invention, the bicycle rear sprocket according to the twenty-fourth aspect is configured so that the sprocket member has a multi-layered structure with different materials.

In accordance with a thirty-fifth aspect of the present invention, a rotatable annular bicycle component comprises a sprocket member and a sprocket supporting member. The sprocket member comprises sprocket teeth and a plurality of coupling portions. The sprocket teeth are configured to engage with a bicycle chain. The coupling portions are arranged in a circumferential direction of the rotatable annular bicycle component. The coupling portions are at least partially arranged in the circumferential direction at an irregular pitch. The sprocket supporting member includes sprocket attachment parts to which the coupling portions are respectively attached.

In accordance with a thirty-sixth aspect of the present invention, the rotatable annular bicycle component according to the thirty-fifth aspect is configured so that the sprocket attachment parts are at least partially arranged in the circumferential direction at an irregular pitch.

In accordance with a thirty-seventh aspect of the present invention, the rotatable annular bicycle component according to the thirty-fifth aspect further comprises a hub engaging member configured to be attached to the sprocket supporting member and configured to engage with a bicycle hub assembly. The sprocket member comprises a first material. The sprocket supporting member comprises a second material different from the first material. The hub engaging member comprises a third material different from the second material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
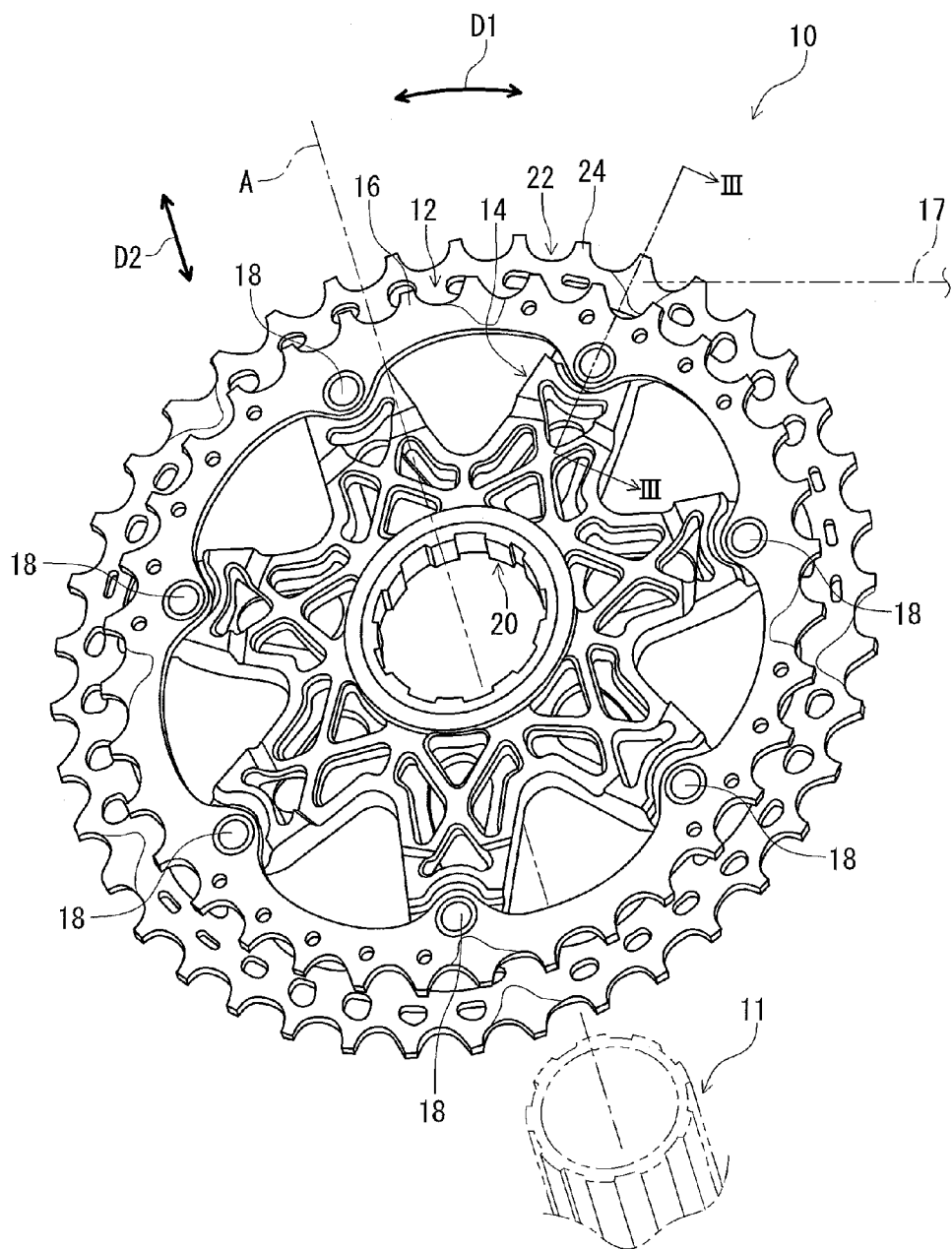
FIG. 1 is a perspective view of a rotatable annular bicycle component in accordance with a first embodiment.

The embodiments will now be described with reference to the accompanying drawings, wherein like reference numerals designate corresponding or identical elements throughout the various drawings.

First Embodiment

Referring initially to FIG. 1, a rotatable annular bicycle component 10 in accordance with a first embodiment is illustrated. In the illustrated embodiment, the rotatable annular bicycle component 10 is a bicycle rear sprocket; however, the rotatable annular bicycle component 10 can be annular bicycle components such as a disc rotor. The rotatable annular bicycle component 10 is configured to be attached to a bicycle hub assembly 11. The rotatable annular bicycle component 10 is configured to be rotatable about a rotational center axis A. The rotatable annular bicycle component 10 (or the bicycle rear sprocket) comprises an outer annular member 12 (or a sprocket member) and an intermediate supporting member 14 (or a sprocket supporting member).

In the illustrated embodiment, the outer annular member 12 is a sprocket member. More specifically, the outer annular member 12 (or the sprocket member) includes sprocket teeth 16 configured to engage with a bicycle chain 17. The sprocket teeth 16 are arranged in a circumferential direction D1 of the rotatable annular bicycle component 10. The outer annular member 12 (or the sprocket member) is configured to be attached to the intermediate supporting member 14 (the sprocket supporting member). In the illustrated embodiment, the outer annular member 12 is coupled to the intermediate supporting member 14 using fasteners 18 (e.g., rivets).

The rotatable annular bicycle component 10 (or the bicycle rear sprocket) further comprises a hub engaging member 20 configured to be attached to the intermediate supporting member 14 (or the sprocket supporting member). The hub engaging member 20 is configured to engage with the bicycle hub assembly 11.

As seen in FIG. 1, the rotatable annular bicycle component 10 further comprises at least one additional outer annular member including sprocket teeth configured to engage with the bicycle chain 17. The at least one additional outer annular member is attached to the intermediate supporting member 14. In the illustrated embodiment, the rotatable annular bicycle component 10 comprises an additional outer annular member 22 including sprocket teeth 24 configured to engage with the bicycle chain 17. The sprocket teeth 24 are arranged in the circumferential direction D1 of the rotatable annular bicycle component 10. The outer annular member 12 and the additional outer annular member 22 are arranged in an axial direction D2 parallel to the rotational center axis A. The rotatable annular bicycle component 10 includes two outer annular members; however, the number of outer annular members is not limited to the illustrated embodiment. The additional outer annular member 22 has a maximum outer diameter greater than a maximum outer diameter of the outer annular member 12. The number of the sprocket teeth of the additional outer annular member 22 is greater than the number of the sprocket teeth of the outer annular member 12.

The outer annular member 12 (or the sprocket member) comprises a first material. The outer annular member 12 is made of the first material. The intermediate supporting member 14 (or the sprocket supporting member) comprises a second material different from the first material. The intermediate supporting member 14 is made of the second material. The hub engaging member 20 comprises a third material different from the second material.

The first material comprises a metallic material. The first material, for example, comprises one of iron and titanium. The first material can, however, comprise a metallic material other than iron and titanium. For example, the additional outer annular member 22 can comprise a metallic material same as the first material. The second material comprises a non-metallic material. The second material, for example, comprises a resin material. The second material, preferably, comprises fiber reinforced plastic. The second material can, however, comprise material other than the resin material. For example, the second material can comprise a metallic material different from the first material and the third material. Furthermore, the second material can comprise the resin material other than the fiber reinforced plastic. The third material comprises a metallic material. The third material, for example, comprises one of aluminum, iron and titanium. The third material can, however, comprise a metallic material other than aluminum, iron and titanium.

Figure 2:
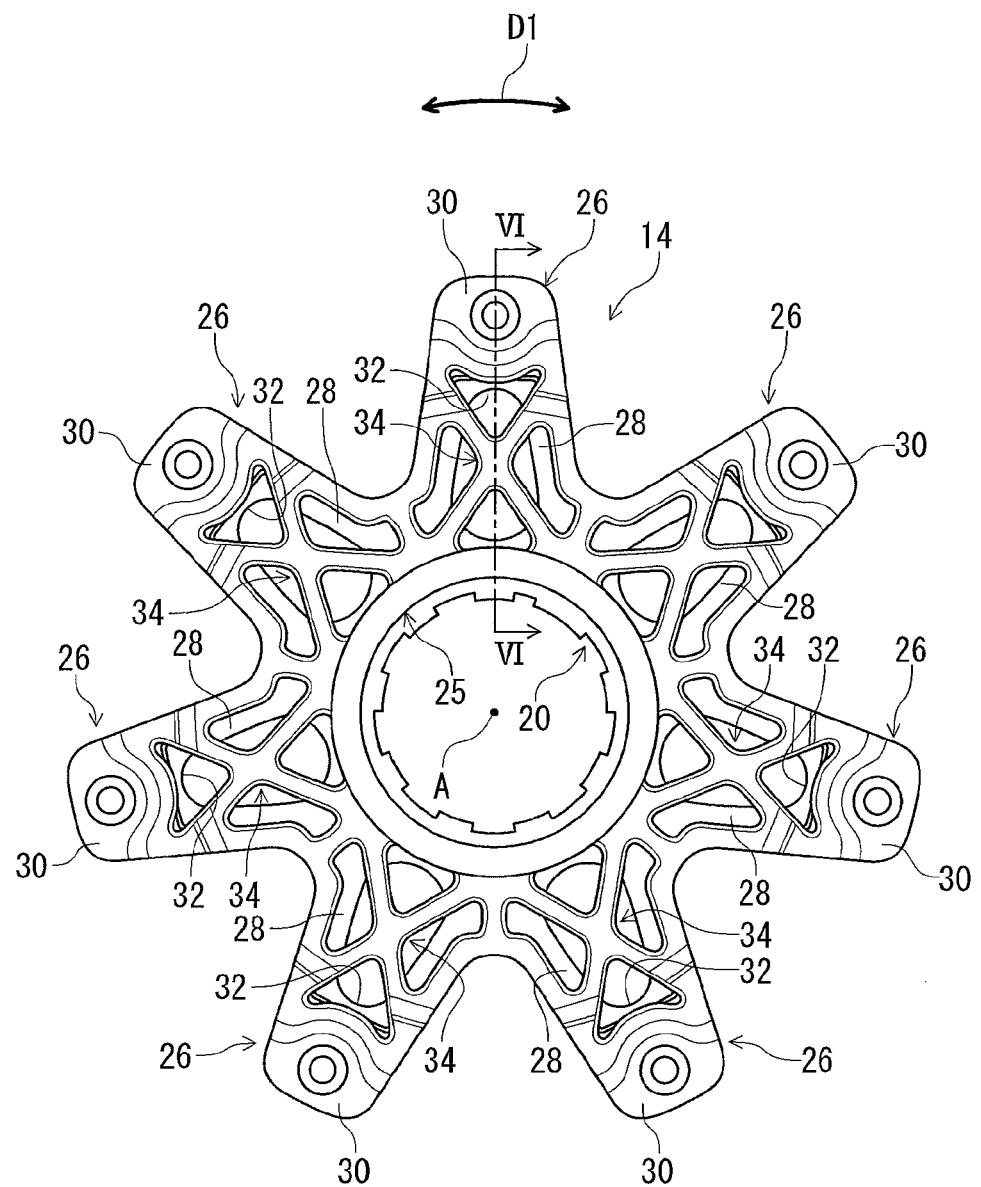
FIG. 2 is an outside elevational view of an intermediate supporting member and a hub engaging member of the rotatable annular bicycle component illustrated in FIG. 1.

As seen in FIG. 2, the intermediate supporting member 14 includes an annular base portion 25 and supporting portions 26. Each of the supporting portions 26 protrudes radially outward from the annular base portion 25. The supporting portions 26 are arranged in the circumferential direction D1 of the rotatable annular bicycle component 10. The supporting portions 26 are spaced apart from each other in the circumferential direction D1. Each of the supporting portions 26 includes a supporting base part 28 and a sprocket attachment part 30. The supporting base part 28 protrudes radially outward from the annular base portion 25. The sprocket attachment part 30 is provided at a radially outer end of the supporting base part 28.

Figure 3:
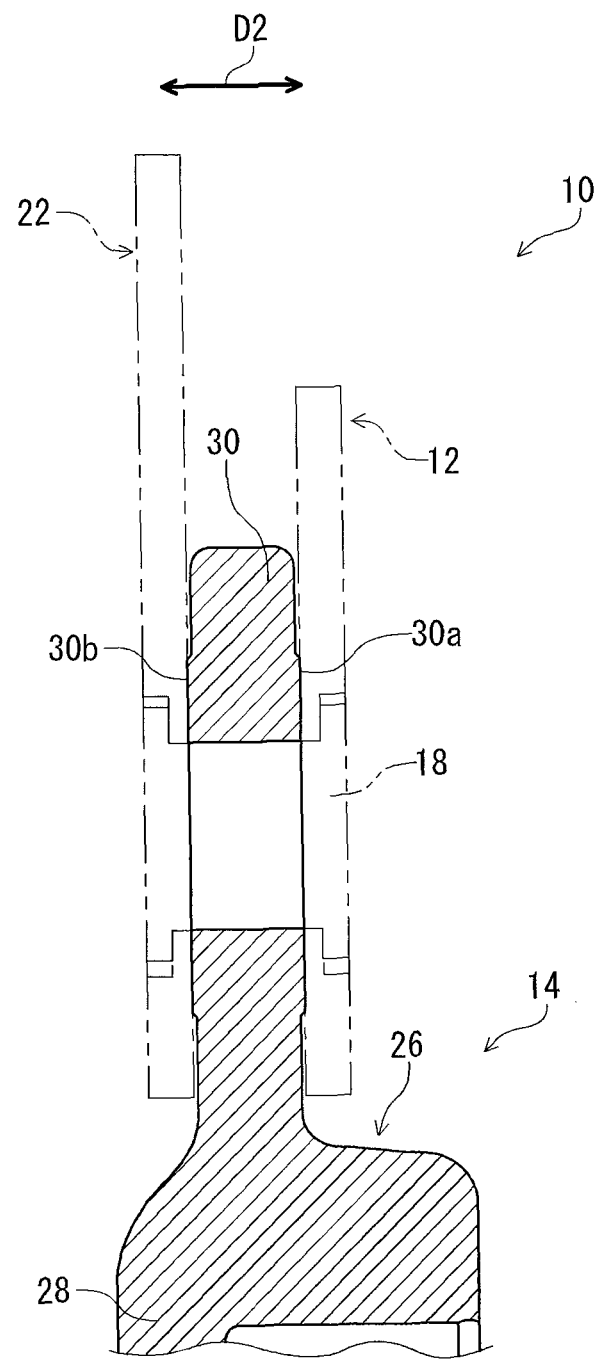
FIG. 3 is a partial cross-sectional view of the rotatable annular bicycle component taken along line III-III of FIG. 1.

As seen in FIG. 3, the outer annular member 12 and the additional outer annular member 22 are coupled to the sprocket attachment part 30 by the fasteners 18. The outer annular member 12 is disposed on a first surface 30a of the sprocket attachment part 30. The additional outer annular member 22 is disposed on a second surface 30b of the sprocket attachment part 30. The second surface 30b is opposite to the first surface 30a in the axial direction D2 of the rotatable annular bicycle component 10. The outer annular member 12 and the additional outer annular member 22 are supported by the intermediate supporting member 14 to be spaced apart from each other in the axial direction D2.

Figure 4:
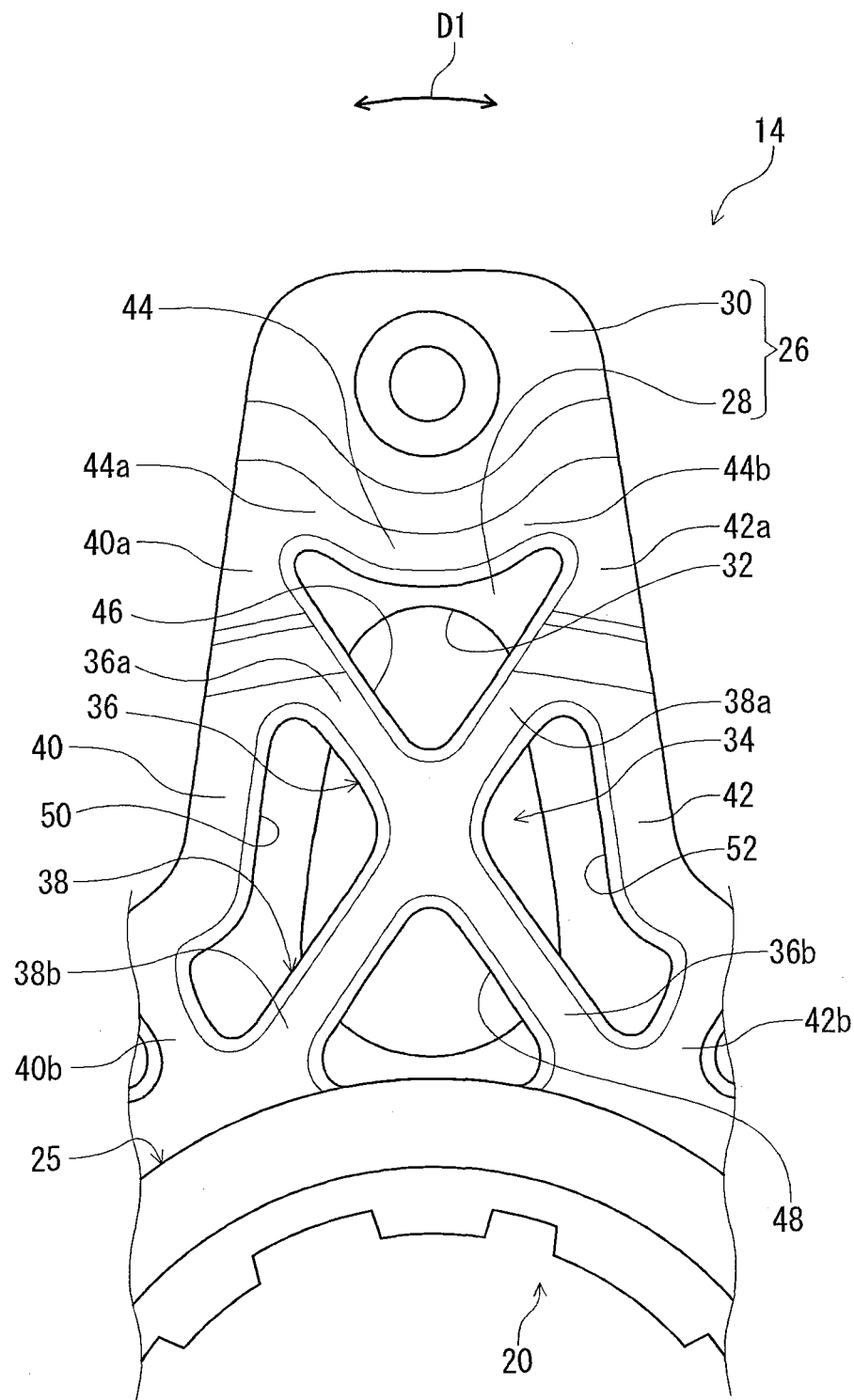
FIG. 4 is an enlarged outside elevational view of a part of the intermediate supporting member illustrated in FIG. 2.

As seen in FIGS. 2 and 4, the intermediate supporting member 14 (or the sprocket supporting member) comprises a weight-saving opening and a reinforcing rib. In the illustrated embodiment, the intermediate supporting member 14 comprises a plurality of weight-saving openings 32 and a plurality of reinforcing ribs 34; however, the outer annular member 12 can comprise at least one weight-saving opening 32 and at least one reinforcing rib 34.

As seen in FIG. 4, the weight-saving opening 32 is provided on the supporting base part 28. The reinforcing rib 34 is provided on the supporting base part 28. The reinforcing rib 34 at least partly overlaps with the weight-saving opening 32 when viewed from the axial direction D2 parallel to the rotational center axis A of the rotatable annular bicycle component 10 (or the bicycle rear sprocket). Each of the reinforcing ribs 34 includes a first rib 36 and a second rib 38. The first rib 36 and the second rib 38 are provided on the supporting base part 28. The first rib 36 and the second rib 38 intersect with each other. The first rib 36 is connected with the second rib 38 at substantially center positions of the first rib 36 and the second rib 38.

The reinforcing rib 34 further includes a third rib 40, a fourth rib 42 and a fifth rib 44. The third rib 40, the fourth rib 42 and the fifth rib 44 are provided on the supporting base part 28. The third rib 40 and the fourth rib 42 are spaced apart from each other in the circumferential direction D1. The fifth rib 44 is provided radially outward of the weight-saving opening 32. A first end 44a of the fifth rib 44 is connected with a radially outer end 40a of the third rib 40. A second end 44b of the fifth rib 44 is connected with a radially outer end 42a of the fourth rib 42.

The first rib 36 and the second rib 38 are provided between the third rib 40 and the fourth rib 42 in the circumferential direction D1. A first end 36a of the first rib 36 is connected with the radially outer end 40a of the third rib 40. A second end 36b of the first rib 36 is connected with a radially inner end 42b of the fourth rib 42. A first end 38a of the second rib 38 is connected with the radially outer end 42a of the fourth rib 42. A second end 38b of the second rib 38 is connected with a radially inner end 40b of the third rib 40. The radially inner end 40b of the third rib 40 is connected with the annular base portion 25. The radially inner end 42b of the fourth rib 42 is connected with the annular base portion 25. The first rib 36 and the second rib 38 are surrounded by the third rib 40, the fourth rib 42, the fifth rib 44 and the annular base portion 25.

The intermediate supporting member 14 includes a first opening 46, a second opening 48, a third opening 50 and a fourth opening 52 which are defined by the first rib 36, the second rib 38, the third rib 40, the fourth rib 42, the fifth rib 44 and the annular base portion 25. Each of the first opening 46, the second opening 48, the third opening 50 and the fourth opening 52 partly overlaps with the weight-saving opening 32 when viewed from the axial direction D2.

Figure 5:
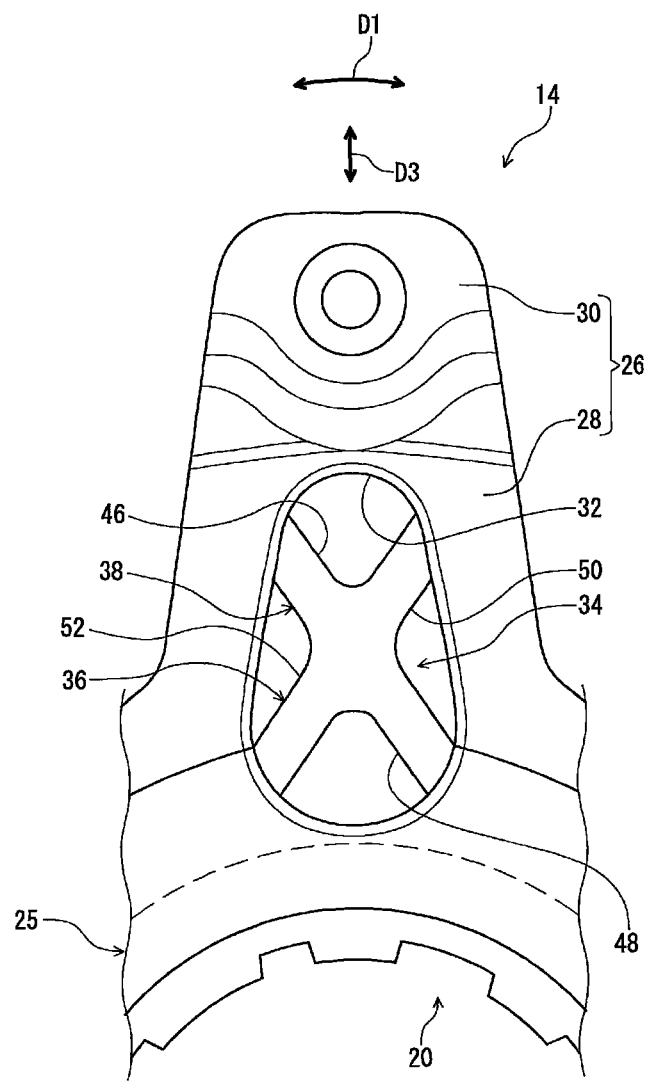
FIG. 5 is an enlarged inside elevational view of a part of the intermediate supporting member illustrated in FIG. 2.

As seen in FIG. 5, the weight-saving opening 32 partly overlaps with each of the first opening 46, the second opening 48, the third opening 50 and the fourth opening 52 when viewed from the axial direction D2. The weight-saving opening 32 at least partly overlaps with the first rib 36 and the second rib 38 of the reinforcing rib 34. The weight-saving opening 32 extends in a radial direction D3 of the rotatable annular bicycle component 10.

Figure 6:
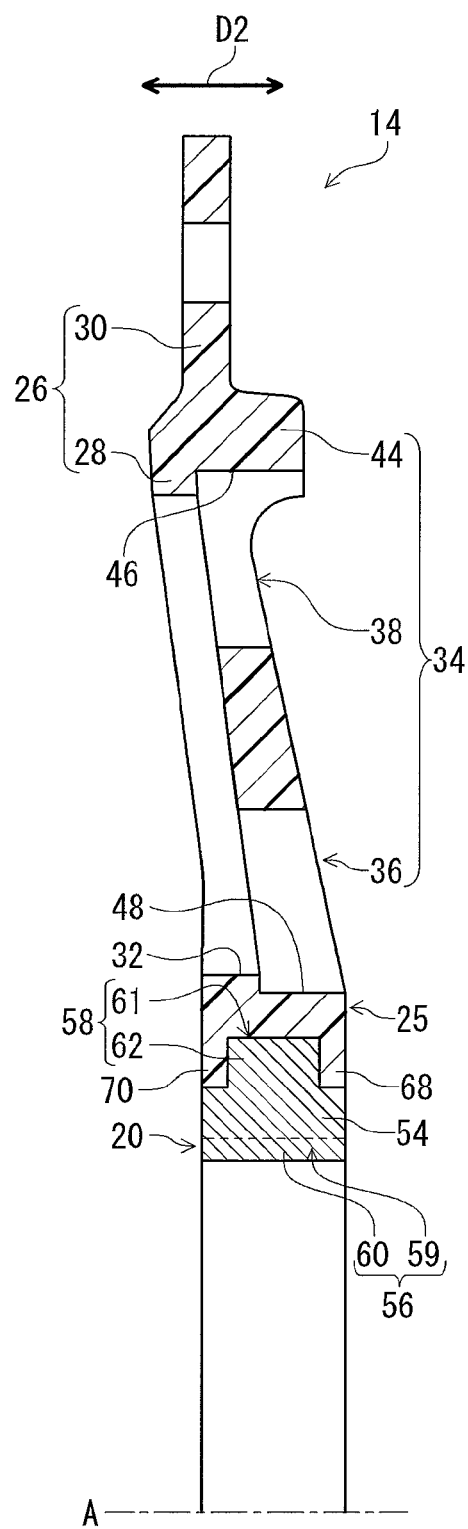
FIG. 6 is a partial cross-sectional view of the intermediate supporting member and the hub engaging member taken along line VI-VI of FIG. 2.

As seen in FIG. 6, the reinforcing rib 34 is at least partly provided outside the weight-saving opening 32 in the axial direction D2. In the illustrated embodiment, the reinforcing rib 34 is entirely provided outside the weight-saving opening 32 in the axial direction D2; however, the reinforcing rib 34 can be partly provided outside the weight-saving opening 32 in the axial direction D2.

Figure 7:
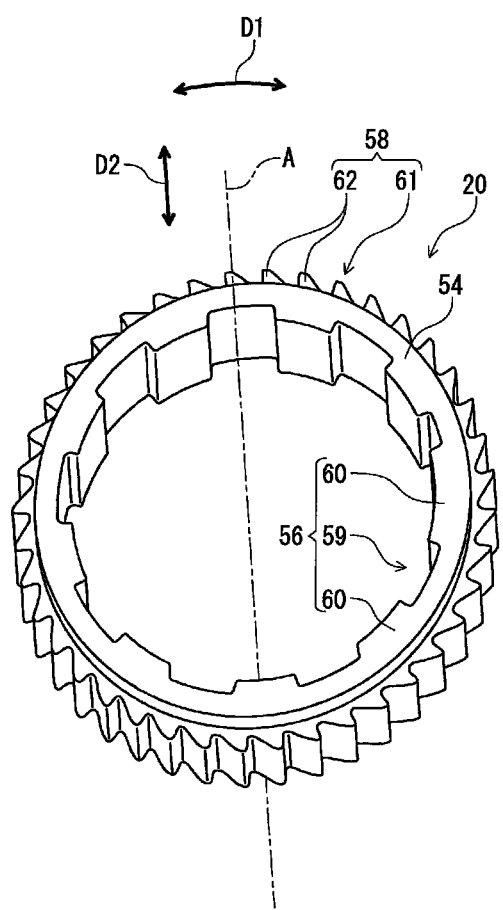
FIG. 7 is a perspective view of the hub engaging member of the rotatable annular bicycle component illustrated in FIG. 1.

As seen in FIG. 7, the hub engaging member 20 includes an annular main-body 54, an inner engaging part 56 and an outer engaging part 58. The annular main-body 54 is provided about the rotational center axis A of the rotatable annular bicycle component 10. The inner engaging part 56 is provided on an inner peripheral part of the annular main-body 54. The inner engaging part 56 includes a first concavo-convex structure 59 configured to engage with a concavo-convex structure of the bicycle hub assembly 11 (FIG. 1). The first concavo-convex structure 59 includes spline teeth 60 arranged in the circumferential direction D1. The spline teeth 60 radially inwardly protrude from the annular main-body 54. The spline teeth 60 are configured to mesh with spline teeth 60 of the concavo-convex structure of the bicycle hub assembly 11 (FIG. 1). The outer engaging part 58 is provided on an outer peripheral part of the annular main-body 54. The outer engaging part 58 includes a second concavo-convex structure 61 configured to engage with the intermediate supporting member 14 (or the sprocket supporting member). The second concavo-convex structure 61 includes first protrusions 62 arranged in the circumferential direction D1 of the rotatable annular bicycle component 10. The first protrusions 62 radially outward protrude from the annular main-body 54.

Figure 8:
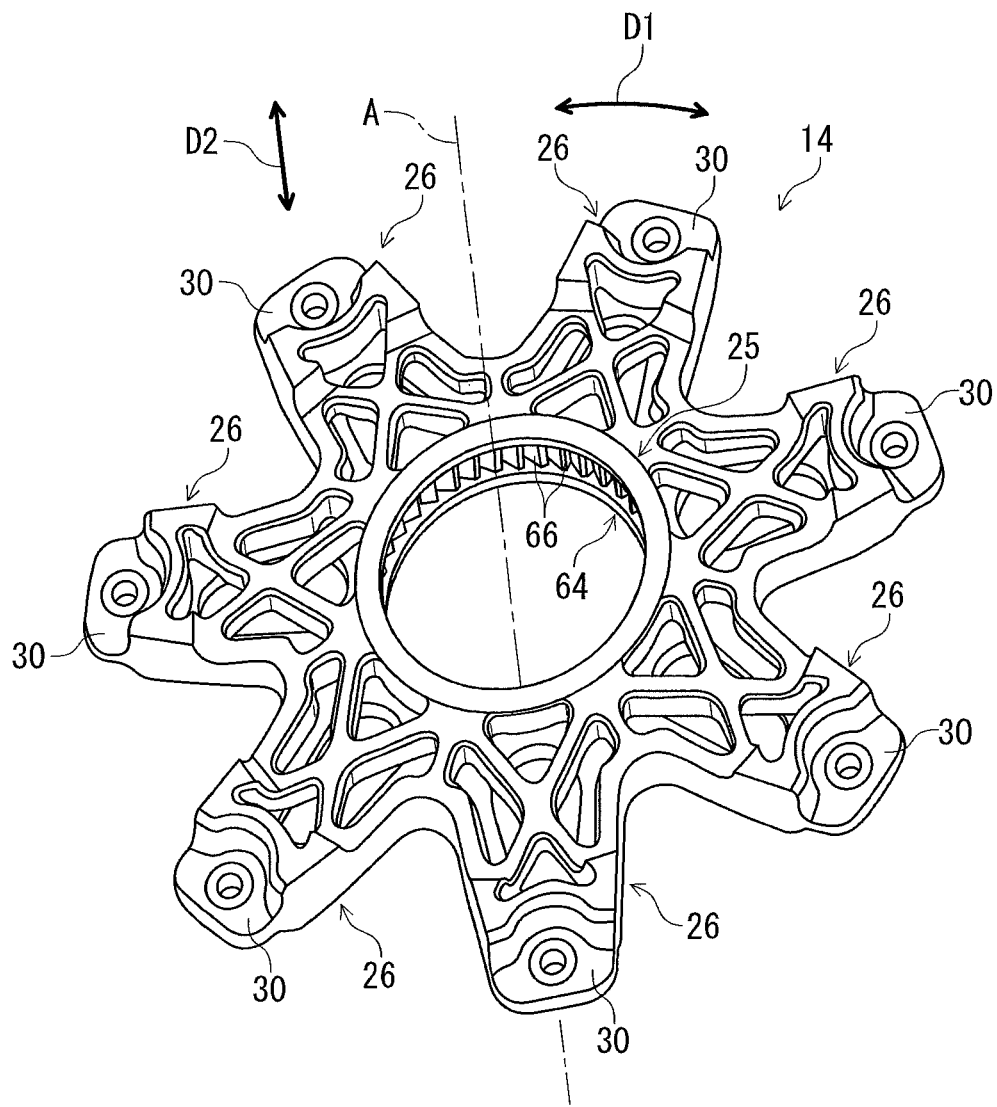
FIG. 8 is a perspective view of the intermediate supporting member of the rotatable annular bicycle component illustrated in FIG. 1.

As seen in FIG. 8, the intermediate supporting member 14 (or the sprocket supporting member) includes a third concavo-convex structure 64 configured to engage with the second concavo-convex structure 61 of the hub engaging member 20 (FIG. 7). More specifically, the third concavo-convex structure 64 includes second protrusions 66 provided on an inner peripheral part of the annular base portion 25 of the intermediate supporting member 14. The second protrusions 66 are arranged in the circumferential direction D1 of the rotatable annular bicycle component 10. The second protrusions 66 mesh with the first protrusions 62 of the second concavo-convex structure 61.

In the illustrated embodiment, the intermediate supporting member 14 (or the sprocket supporting member) is made of a resin material such as fiber reinforced plastic, and the hub engaging member 20 is made of a metallic material such as aluminum, iron and titanium. Preferably, the intermediate supporting member 14 is integrally formed with the hub engaging member 20 by an integral molding process. For example, the intermediate supporting member 14 is integrally formed with the hub engaging member 20 by an insert molding process. Accordingly, the second protrusions 66 of the third concavo-convex structure 64 have complementary shapes with the first protrusions 62 of the second concavo-convex structure 61. Thus, rotational force can be transmitted between the intermediate supporting member 14 and the hub engaging member 20.

Returning to FIG. 6, a part of the hub engaging member 20 (e.g., the first protrusions 62 of the second concavo-convex structure 61) is embedded in the annular base portion 25 of the intermediate supporting member 14. The annular base portion 25 of the intermediate supporting member 14 includes a first annular wall part 68 and a second annular wall part 70 which are provided on an inner peripheral part of the annular base portion 25. The first annular wall part 68 is spaced apart from the second annular wall part 70 in the axial direction D2. The second protrusions 66 are provided between the first annular wall part 68 and the second annular wall part 70 in the axial direction D2. The above structure prevents the hub engaging member 20 from being unintentionally removed from the intermediate supporting member 14.

With the rotatable annular bicycle component 10, the second material of the intermediate supporting member 14 is different from the first material of the outer annular member 12, and the third material of the hub engaging member 20 is different from the second material of the intermediate supporting member 14. Accordingly, weight and/or rigidity of the rotatable annular bicycle component 10 can be adjusted by changing the first material, the second material and the third material.

With the rotatable annular bicycle component 10, the weight-saving opening 32 can reduce weight of the rotatable annular bicycle component 10. Furthermore, since the reinforcing rib 34 at least partly overlaps with the weight-saving opening 32 when viewed from the axial direction D2, necessary strength of the rotatable annular bicycle component 10 can be maintained by the reinforcing rib 34.

Second Embodiment

A rotatable annular bicycle component 210 in accordance with a second embodiment will be described below referring to FIGS. 9 to 11. The rotatable annular bicycle component 210 has substantially the same configuration as the rotatable annular bicycle component 10. Thus, elements having substantially the same function as those in the first embodiment will be numbered the same here, and will not be described again in detail here for the sake of brevity.

Figure 9:
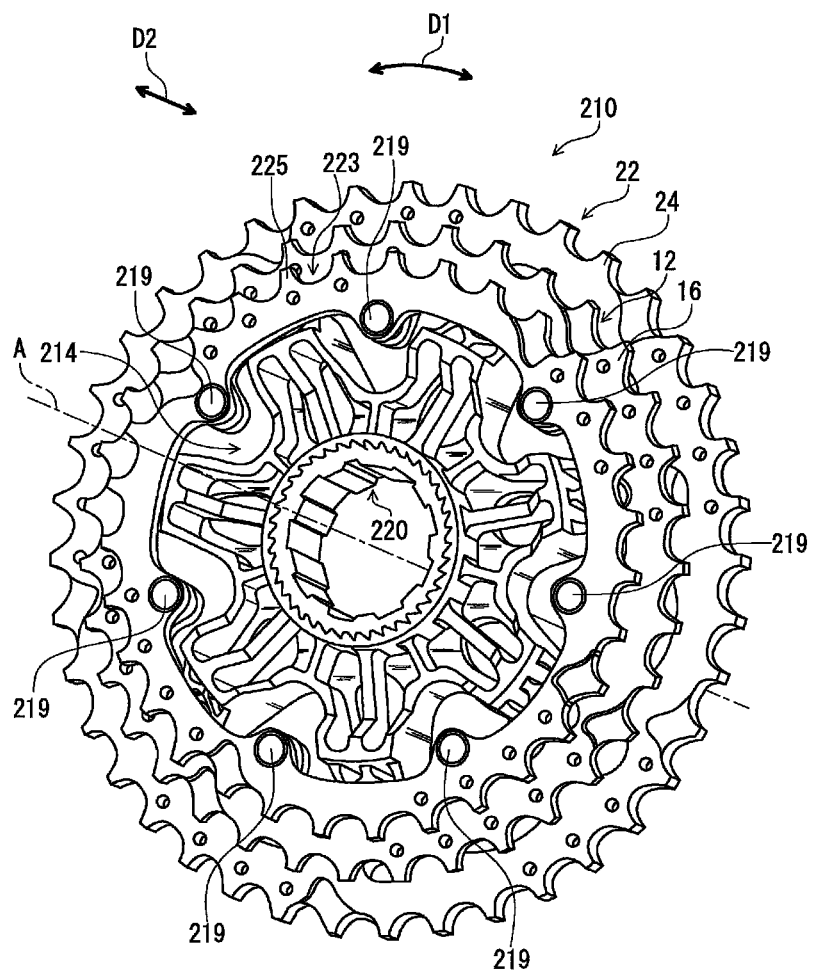
FIG. 9 is a perspective view of a rotatable annular bicycle component in accordance with a second embodiment.

As seen in FIG. 9, the rotatable annular bicycle component 210 (or the bicycle rear sprocket) comprises the outer annular member 12 (or a sprocket member) and an intermediate supporting member 214 (or a sprocket supporting member). The outer annular member 12 (or the sprocket member) is configured to be attached to the intermediate supporting member 214 (the sprocket supporting member). The rotatable annular bicycle component 210 further comprises a hub engaging member 220 configured to be attached to the intermediate supporting member 214 (or the sprocket supporting member). The hub engaging member 220 is configured to engage with the bicycle hub assembly 11 (FIG. 1).

As seen in FIG. 9, the rotatable annular bicycle component 210 further comprises at least one additional outer annular member including sprocket teeth configured to engage with a bicycle chain. The at least one additional outer annular member is attached to the intermediate supporting member 214. In the illustrated embodiment, the rotatable annular bicycle component 210 comprises the additional outer annular members 22 and 223. The additional outer annular member 223 includes sprocket teeth 225 configured to engage with the bicycle chain 17 (FIG. 1). The sprocket teeth 225 are arranged in a circumferential direction D1 of the rotatable annular bicycle component 210. The additional outer annular member 223 is coupled to the outer annular member 12 using fasteners 219 (e.g., rivets).

Figure 10:
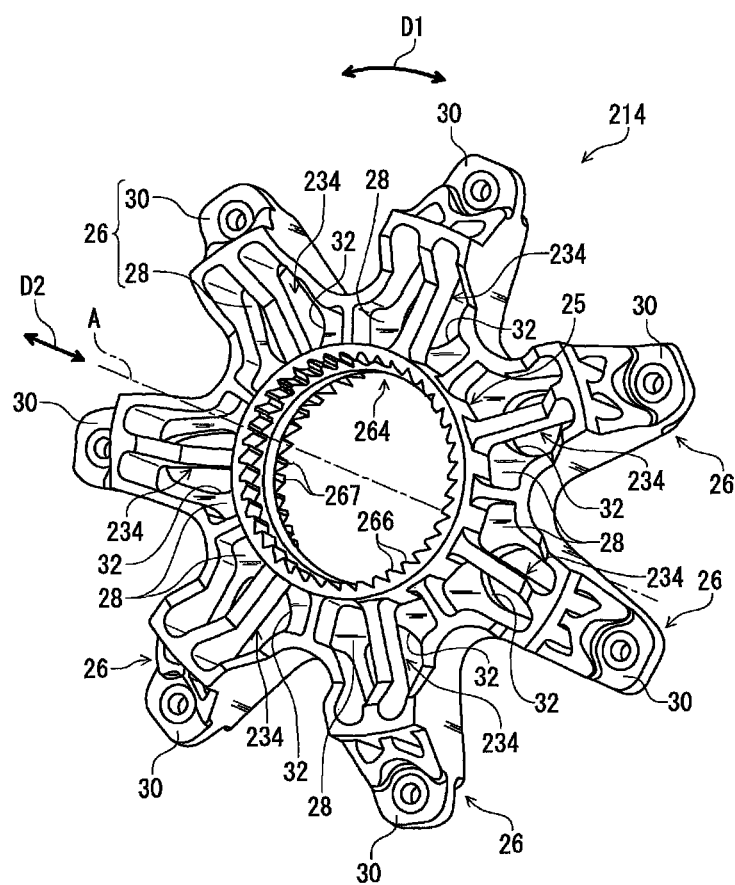
FIG. 10 is a perspective view of an intermediate supporting member of the rotatable annular bicycle component illustrated in FIG. 9.

As seen in FIG. 10, the intermediate supporting member 214 (or the sprocket supporting member) comprises a weight-saving opening and a reinforcing rib. In the illustrated embodiment, the intermediate supporting member 214 comprises a plurality of weight-saving openings 32 and a plurality of reinforcing ribs 234; however, the outer annular member 12 can comprise at least one weight-saving opening 32 and at least one reinforcing rib 234.

The reinforcing rib 234 at least partly overlaps with the weight-saving opening 32 when viewed from the axial direction D2 parallel to the rotational center axis A of the rotatable annular bicycle component 210 (or the bicycle rear sprocket).

As seen in FIG. 10, the reinforcing rib 234 is at least partly provided outside the weight-saving opening 32 in the axial direction D2. In the illustrated embodiment, the reinforcing rib 234 is entirely provided outside the weight-saving opening 32 in the axial direction D2; however, the reinforcing rib 234 can be partly provided outside the weight-saving opening 32 in the axial direction D2.

Figure 11:
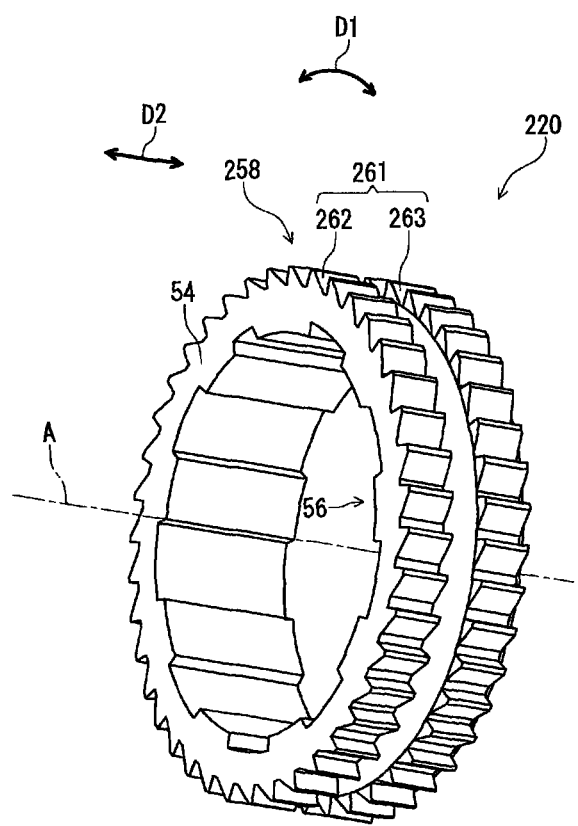
FIG. 11 is a perspective view of a hub engaging member of the rotatable annular bicycle component illustrated in FIG. 9.

As seen in FIG. 11, the hub engaging member 220 includes the annular main-body 54, the inner engaging part 56 and an outer engaging part 258. The outer engaging part 258 is provided on an outer peripheral part of the annular main-body 54. The outer engaging part 258 includes a second concavo-convex structure 261 configured to engage with the intermediate supporting member 214 (or the sprocket supporting member). The second concavo-convex structure 261 includes first protrusions 262 and second protrusions 263. The first protrusions 262 are arranged in the circumferential direction D1 of the rotatable annular bicycle component 210. The second protrusions 263 are arranged in the circumferential direction D1. The first protrusions 262 and the second protrusions 263 radially outward protrude from the annular main-body 54. The first protrusions 262 are spaced apart from the second protrusions 263 in the axial direction D2.

As seen in FIG. 10, the intermediate supporting member 214 (or the sprocket supporting member) includes a third concavo-convex structure 264 configured to engage with the second concavo-convex structure 261 of the hub engaging member 220. More specifically, the third concavo-convex structure 264 includes third protrusions 266 and fourth protrusions 267 provided on an inner peripheral part of the annular base portion 25 of the intermediate supporting member 214. The third protrusions 266 are arranged in the circumferential direction D1 of the rotatable annular bicycle component 210 (FIG. 11). The fourth protrusions 267 are arranged in the circumferential direction D1 of the rotatable annular bicycle component 210. The third protrusions 266 mesh with the first protrusions 262 of the second concavo-convex structure 261. The fourth protrusions 267 mesh with the second protrusions 263 of the second concavo-convex structure 261.

In the illustrated embodiment, the intermediate supporting member 214 (or the sprocket supporting member) is made of a resin material such as fiber reinforced plastic, and the hub engaging member 220 is made of a metallic material such as aluminum, iron and titanium. Preferably, the intermediate supporting member 214 is integrally formed with the hub engaging member 220 by an integral molding process. For example, the intermediate supporting member 214 is integrally formed with the hub engaging member 220 by an insert molding process. Accordingly, as seen in FIGS. 9 to 11, the third protrusions 266 of the third concavo-convex structure 264 have complementary shapes with the first protrusions 262 of the second concavo-convex structure 261. Similarly, the fourth protrusions 267 of the third concavo-convex structure 264 have complementary shapes with the second protrusions 263 of the second concavo-convex structure 261. Thus, rotational force can be transmitted between the intermediate supporting member 214 and the hub engaging member 220.

Furthermore, a part of the annular base portion 25 of the intermediate supporting member 214 is provided between the first protrusions 262 and the second protrusions 263 of the second concavo-convex structure 261. This structure prevents the hub engaging member 20 from being unintentionally removed from the intermediate supporting member 214.

With the rotatable annular bicycle component 210, the second material of the intermediate supporting member 214 is different from the first material of the outer annular member 12, and the third material of the hub engaging member 220 is different from the second material of the intermediate supporting member 214. Accordingly, weight and/or rigidity of the rotatable annular bicycle component 210 can be adjusted by changing the first material, the second material and the third material.

With the rotatable annular bicycle component 210, the weight-saving opening 32 can reduce weight of the rotatable annular bicycle component 210. Furthermore, since the reinforcing rib 234 at least partly overlaps with the weight-saving opening 32 when viewed from the axial direction D2, necessary strength of the rotatable annular bicycle component 210 can be maintained by the reinforcing rib 234.

Third Embodiment

A rotatable annular bicycle component 310 in accordance with a third embodiment will be described below referring to FIGS. 12 to 14. The rotatable annular bicycle component 310 has substantially the same configuration as the rotatable annular bicycle component 10. Thus, elements having substantially the same function as those in the above embodiments will be numbered the same here, and will not be described again in detail here for the sake of brevity.

Figure 12:
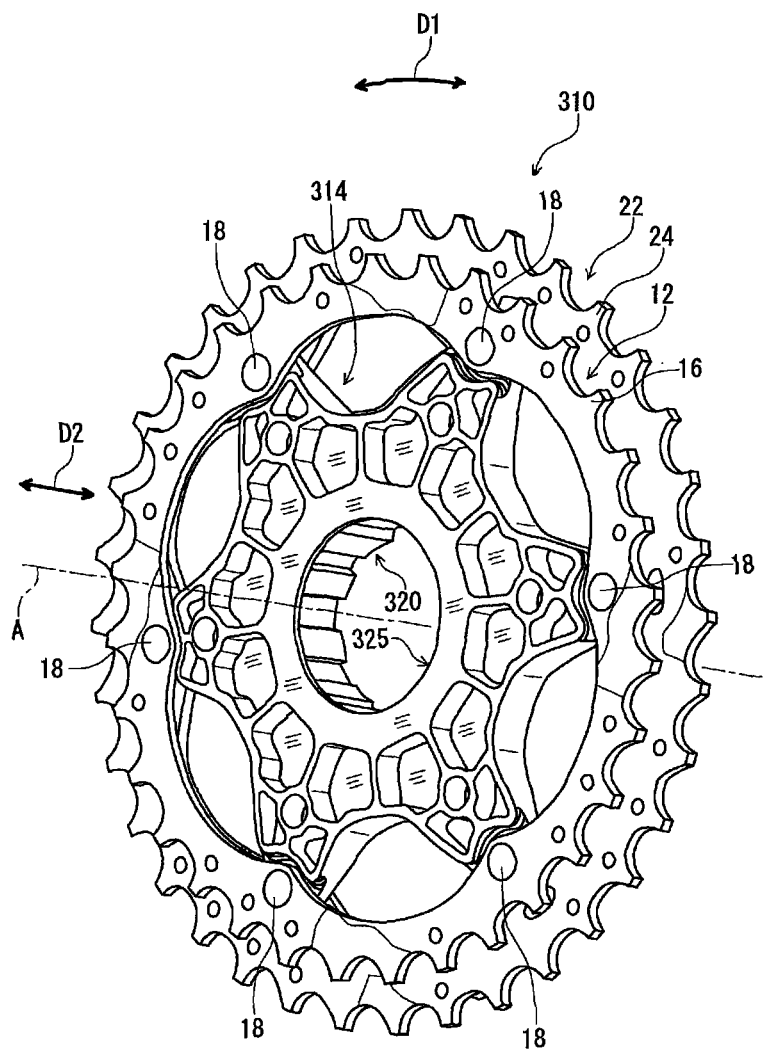
FIG. 12 is a perspective view of a rotatable annular bicycle component in accordance with a third embodiment.

As seen in FIG. 12, the rotatable annular bicycle component 310 (or the bicycle rear sprocket) comprises the outer annular member 12 (or a sprocket member) and an intermediate supporting member 314 (or a sprocket supporting member). The outer annular member 12 (or the sprocket member) is configured to be attached to the intermediate supporting member 314 (the sprocket supporting member). The rotatable annular bicycle component 310 further comprises a hub engaging member 320 configured to be attached to the intermediate supporting member 314 (or the sprocket supporting member). The hub engaging member 320 is configured to engage with the bicycle hub assembly 11 (FIG. 1).

As seen in FIG. 12, the rotatable annular bicycle component 310 further comprises at least one additional outer annular member including sprocket teeth configured to engage with the bicycle chain 17 (FIG. 1). The at least one additional outer annular member is attached to the intermediate supporting member 314. In the illustrated embodiment, the rotatable annular bicycle component 310 comprises the additional outer annular member 22. The additional outer annular member 22 is coupled to the intermediate supporting member 314 using the fasteners 18 (e.g., rivets).

Figure 13:
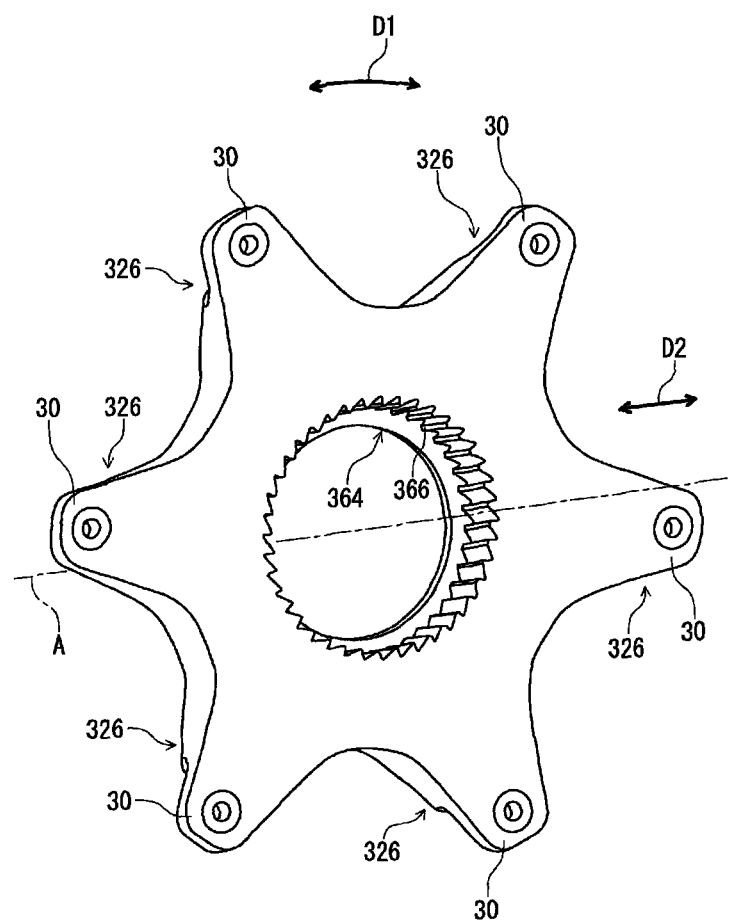
FIG. 13 is a perspective view of an intermediate supporting member of the rotatable annular bicycle component illustrated in FIG. 12.

As seen in FIGS. 12 and 13, unlike the intermediate supporting member 14 in accordance with the first embodiment, the intermediate supporting member 314 (or the sprocket supporting member) does not include a weight-saving opening. The intermediate supporting member 314 includes an annular base portion 325 and supporting portions 326. Each of the supporting portions 326 protrudes radially outward from the annular base portion 325. Each of the supporting portions 326 includes the sprocket attachment part 30. The weight-saving opening is not provided on the supporting portions 326.

Figure 14:
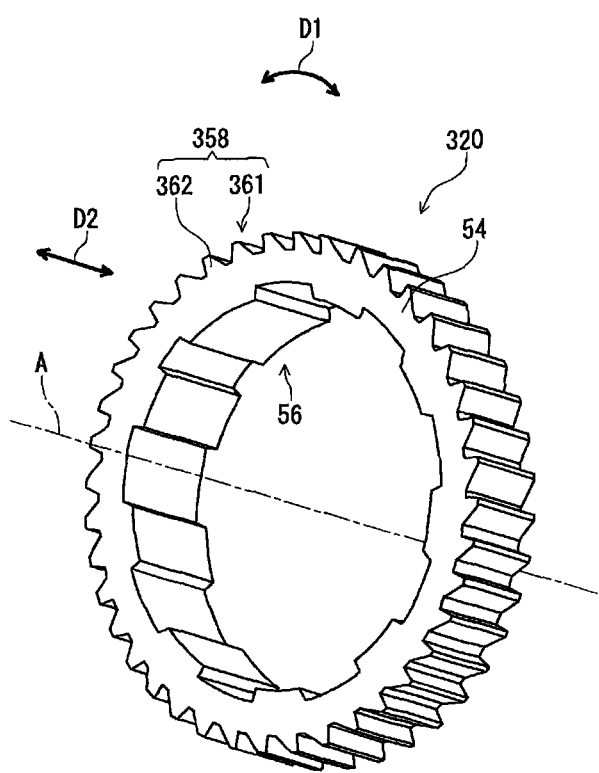
FIG. 14 is a perspective view of a hub engaging member of the rotatable annular bicycle component illustrated in FIG. 12.

As seen in FIG. 14, the hub engaging member 320 includes the annular main-body 54, the inner engaging part 56 and an outer engaging part 358. The outer engaging part 358 is provided on an outer peripheral part of the annular main-body 54. The outer engaging part 358 includes a second concavo-convex structure 361 configured to engage with the intermediate supporting member 314 (or the sprocket supporting member). The second concavo-convex structure 361 includes first protrusions 362 arranged in the circumferential direction D1 of the rotatable annular bicycle component 310.

As seen in FIG. 13, the intermediate supporting member 314 (or the sprocket supporting member) includes a third concavo-convex structure 364 configured to engage with the second concavo-convex structure 361 of the hub engaging member 320. More specifically, the third concavo-convex structure 364 includes second protrusions 366 provided on an inner peripheral part of the annular base portion 325 of the intermediate supporting member 314. The second protrusions 366 are arranged in the circumferential direction D1 of the rotatable annular bicycle component 310. The second protrusions 366 mesh with the first protrusions 362 of the second concavo-convex structure 361 (FIG. 14).

In the illustrated embodiment, the intermediate supporting member 314 (or the sprocket supporting member) is made of a resin material such as fiber reinforced plastic, and the hub engaging member 320 is made of a metallic material such as aluminum, iron and titanium. Preferably, the intermediate supporting member 314 is integrally formed with the hub engaging member 320 by an integral molding process. For example, the intermediate supporting member 314 is integrally formed with the hub engaging member 320 by an insert molding process. Accordingly, the second protrusions 366 of the third concavo-convex structure 364 have complementary shapes with the first protrusions 362 of the second concavo-convex structure 361.

With the rotatable annular bicycle component 310, the second material of the intermediate supporting member 314 is different from the first material of the outer annular member 12, and the third material of the hub engaging member 320 is different from the second material of the intermediate supporting member 314. Accordingly, weight and/or rigidity of the rotatable annular bicycle component 310 can be adjusted by changing the first material, the second material and the third material.

Fourth Embodiment

A rotatable annular bicycle component 410 in accordance with a fourth embodiment will be described below referring to FIGS. 15 and 16. The rotatable annular bicycle component 410 has substantially the same configuration as the rotatable annular bicycle component 10 except for the structures of the outer annular member and the additional outer annular member. Thus, elements having substantially the same function as those in the above embodiments will be numbered the same here, and will not be described again in detail here for the sake of brevity.

Figure 15:
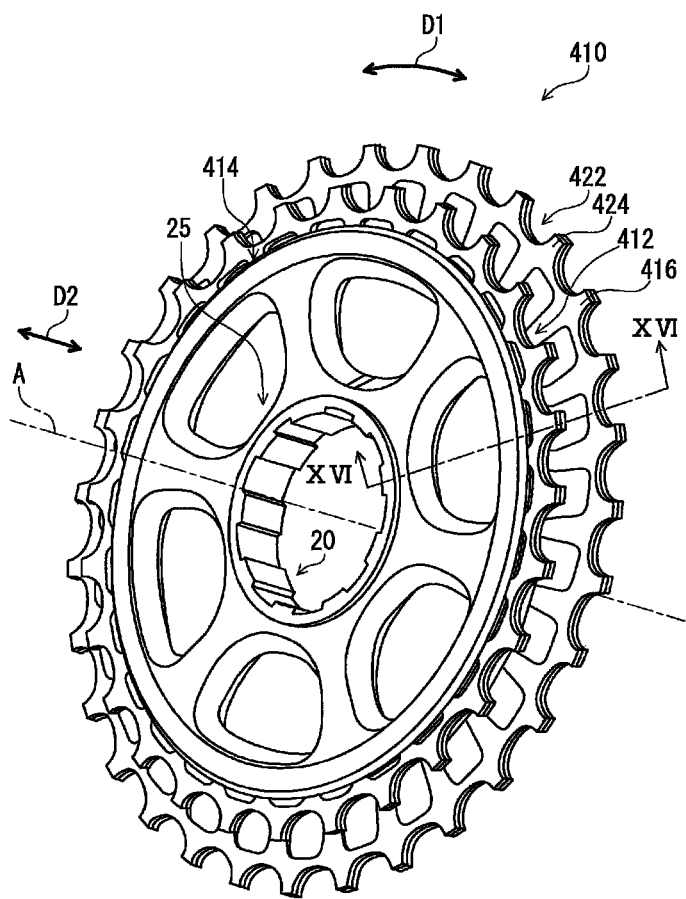
FIG. 15 is a perspective view of a rotatable annular bicycle component in accordance with a fourth embodiment.

As seen in FIG. 15, the rotatable annular bicycle component 410 comprises an outer annular member 412, an intermediate supporting member 414 and the hub engaging member 20. The outer annular member 412 is attached to the intermediate supporting member 414. The outer annular member 412 includes sprocket teeth 416 configured to engage with the bicycle chain 17 (FIG. 1). The hub engaging member 20 is configured to be attached to the intermediate supporting member 414 and is configured to engage with the bicycle hub assembly 11 (FIG. 1). The outer annular member 412 comprises the first material. The intermediate supporting member 414 comprises the second material different from the first material. The hub engaging member 20 comprises the third material different from the second material. The rotatable annular bicycle component 410 further comprises an additional outer annular member 422 including sprocket teeth 424 configured to engage with the bicycle chain 17 (FIG. 1).

The first material comprises a metallic material. The first material, for example, comprises one of iron and titanium. The second material comprises a non-metallic material. The second material comprises a resin material. The second material, for example, comprises fiber reinforced plastic. The third material comprises a metallic material. The third material, for example, comprises one of aluminum, iron and titanium.

Figure 16:
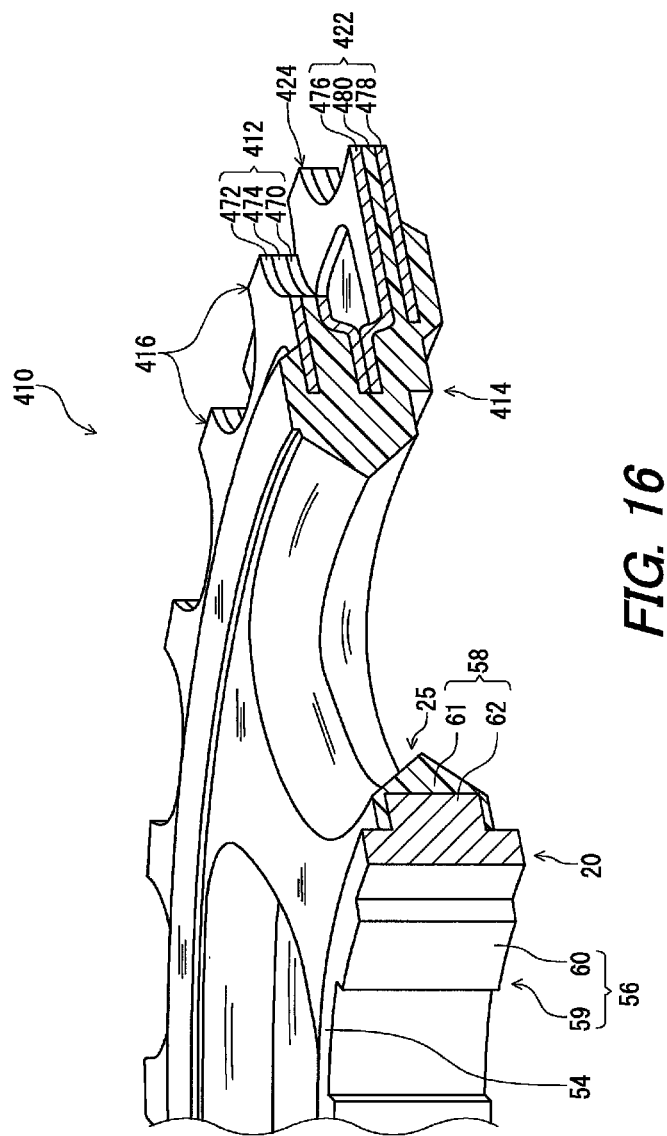
FIG. 16 is a cross-sectional view of the rotatable annular bicycle component taken along line XVI-XVI of FIG. 15.

As seen in FIG. 16, the outer annular member (or the sprocket member) 412 has a multi-layered structure with different materials. More specifically, the outer annular member (or the sprocket member) 412 includes a first sprocket layer 470, a second sprocket layer 472, and a third sprocket layer 474.

The first sprocket layer 470 comprises the first material. The second sprocket layer 472 comprises a fourth material. The third sprocket layer 474 comprises a fifth material and is provided between the first sprocket layer 470 and the second sprocket layer 472. The first material comprises a metallic material. The fourth material comprises a metallic material. The fifth material comprises a non-metallic material.

In the illustrated embodiment, the second material and the fifth material comprise the resin material such as fiber reinforced plastic. The first sprocket layer 470, the second sprocket layer 472 and the third sprocket layer 474 are integrally formed with the intermediate supporting member 414.

For example, the first sprocket layer 470, the second sprocket layer 472 and the third sprocket layer 474 are integrally formed with the intermediate supporting member (or the sprocket supporting member) 414 by an integral molding process.

Furthermore, the additional outer annular member 422 has a multi-layered structure with different materials and includes a fourth sprocket layer 476, a fifth sprocket layer 478, and a sixth sprocket layer 480. The fourth sprocket layer 476 comprises a metallic material. The fifth sprocket layer 478 comprises a metallic material. The sixth sprocket layer 480 comprises a non-metallic material and is provided between the fourth sprocket layer 476 and the fifth sprocket layer 478. In the illustrated embodiment, the sixth sprocket layer 480 comprises the resin material such as fiber reinforced plastic as well as the intermediate supporting member 414 and the third sprocket layer 474. The fourth sprocket layer 476, the fifth sprocket layer 478 and the sixth sprocket layer 480 are integrally formed with the intermediate supporting member 414. For example, the fourth sprocket layer 476, the fifth sprocket layer 478 and the sixth sprocket layer 480 are integrally formed with the intermediate supporting member 414 by an integral molding process. Furthermore, the fourth sprocket layer 476 is joined to the first sprocket layer 470 by defused joining. In the illustrated embodiment, an inner peripheral part of the fourth sprocket layer 476 is joined to an inner peripheral part of the first sprocket layer 470 by defused joining.

With the rotatable annular bicycle component 410, the second material of the intermediate supporting member 414 is different from the first material of the outer annular member 412, and the third material of the hub engaging member 20 is different from the second material of the intermediate supporting member 414. Accordingly, weight and/or rigidity of the rotatable annular bicycle component 410 can be adjusted by changing the first material, the second material and the third material.

Fifth Embodiment

A rotatable annular bicycle component 510 in accordance with a fifth embodiment will be described below referring to FIG. 17. The rotatable annular bicycle component 510 has substantially the same configuration as the rotatable annular bicycle component 410 except for the structures of the outer annular member and the additional outer annular member. Thus, elements having substantially the same function as those in the above embodiments will be numbered the same here, and will not be described again in detail here for the sake of brevity.

Figure 17:
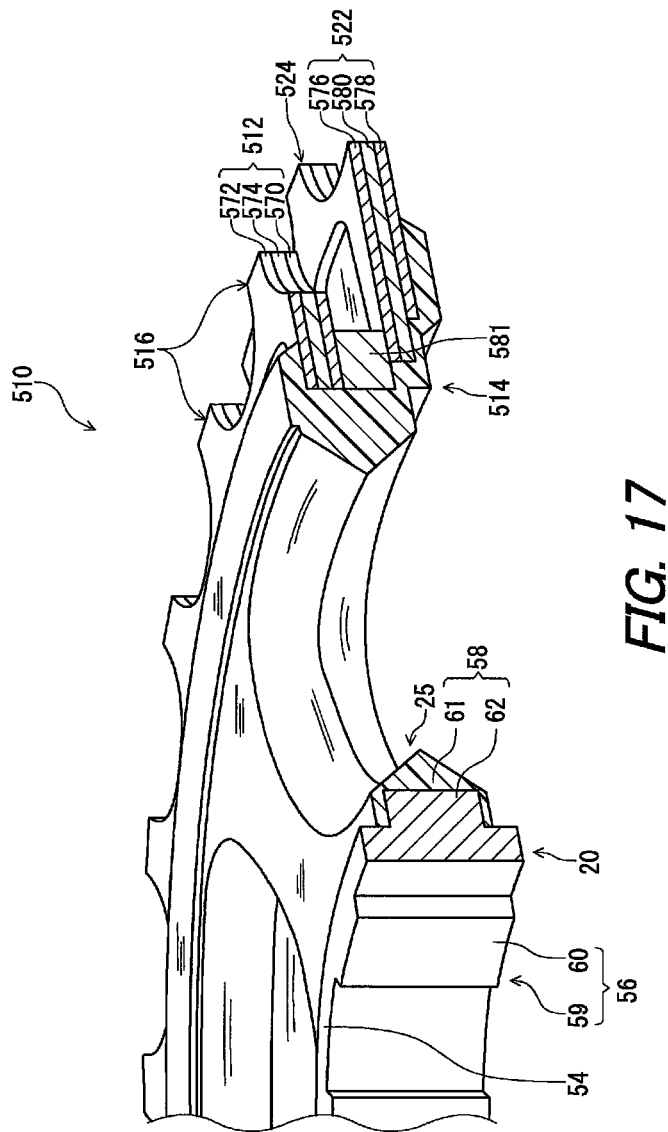
FIG. 17 is a cross-sectional view of a rotatable annular bicycle component in accordance with a fifth embodiment.

As seen in FIG. 17, the rotatable annular bicycle component 510 comprises an outer annular member (or a sprocket member) 512, an intermediate supporting member (or a sprocket supporting member) 514 and an additional outer annular member 522. The outer annular member 512 comprises the first material. The intermediate supporting member 514 comprises the second material different from the first material. The hub engaging member 20 comprises the third material different from the second material. The rotatable annular bicycle component 510 further comprises an additional outer annular member 522 including sprocket teeth 524 configured to engage with the bicycle chain 17 (FIG. 1).

The first material comprises a metallic material. The first material, for example, comprises one of iron and titanium. The second material comprises a non-metallic material. The second material, for example, comprises a resin material. The second material, preferably, comprises fiber reinforced plastic. The third material comprises a metallic material. The third material, for example, comprises one of aluminum, iron and titanium.

As well as the rotatable annular bicycle component 410 in accordance with the fourth embodiment, the outer annular member (or the sprocket member) 512 has a multi-layered structure with different materials. More specifically, the outer annular member (or the sprocket member) 512 includes a first sprocket layer 570, a second sprocket layer 572, and a third sprocket layer 574.

The first sprocket layer 570 comprises the first material. The second sprocket layer 572 comprises a fourth material. The third sprocket layer 574 comprises a fifth material and is provided between the first sprocket layer 570 and the second sprocket layer 572. The first material is different from the fifth material. The fourth material is different from the fifth material. For example, each of the first material, the fourth material and the fifth material comprises a metallic material. The first sprocket layer 570 is bonded to the third sprocket layer 574 with adhesive. The second sprocket layer 572 is bonded to the third sprocket layer 574 with adhesive. The fifth material can be a non-metallic material such as a resin material.

Furthermore, the additional outer annular member 522 has a multi-layered structure with different materials and includes a fourth sprocket layer 576, a fifth sprocket layer 578, and a sixth sprocket layer 580. The fourth sprocket layer 576 comprises material different from material of the sixth sprocket layer 580. The fifth sprocket layer 578 comprises material different from material of the sixth sprocket layer 580. In the illustrated embodiment, the fourth sprocket layer 576 comprises a metallic material. The fifth sprocket layer 578 comprises a metallic material. The sixth sprocket layer 580 comprises a metallic material different from the metallic material of each of the fourth sprocket layer 576 and the fifth sprocket layer 578. The sixth sprocket layer 580 is provided between the fourth sprocket layer 576 and the fifth sprocket layer 578. The fourth sprocket layer 576 is bonded to the sixth sprocket layer 580 with adhesive. The fifth sprocket layer 578 is bonded to the sixth sprocket layer 580 with adhesive.

Furthermore, an intermediate member 581 is provided between the outer annular member 512 and the additional outer annular member 522. For example, the intermediate member 581 is made of a metallic material. The intermediate member 581 has an annular shape and is bonded to each of the outer annular member 512 and the additional outer annular member 522 with adhesive. In the illustrated embodiment, the intermediate member 581 is bonded to each of the first sprocket layer 570 and the fourth sprocket layer 576 with adhesive.

With the rotatable annular bicycle component 510, the second material of the intermediate supporting member 514 is different from the first material of the outer annular member 512, and the third material of the hub engaging member 20 is different from the second material of the intermediate supporting member 514. Accordingly, weight and/or rigidity of the rotatable annular bicycle component 510 can be adjusted by changing the first material, the second material and the third material.

In case that each of the first material, the fourth material and the fifth material comprise a metallic material, the first sprocket layer 570 can be joined to the third sprocket layer 574 by defused joining in stead of adhesive. The second sprocket layer 572 is joined to the third sprocket layer 574 by defused joining in stead of adhesive. The defused joining can be applied to the additional outer annular member 522.

Sixth Embodiment

A rotatable annular bicycle component 610 in accordance with a sixth embodiment will be described below referring to FIG. 18. Unlike the rotatable annular bicycle component 10 in accordance with the first embodiment, the rotatable annular bicycle component 610 comprises a disc rotor. Thus, elements having substantially the same function as those in the above embodiments will be numbered the same here, and will not be described again in detail here for the sake of brevity.

Figure 18:
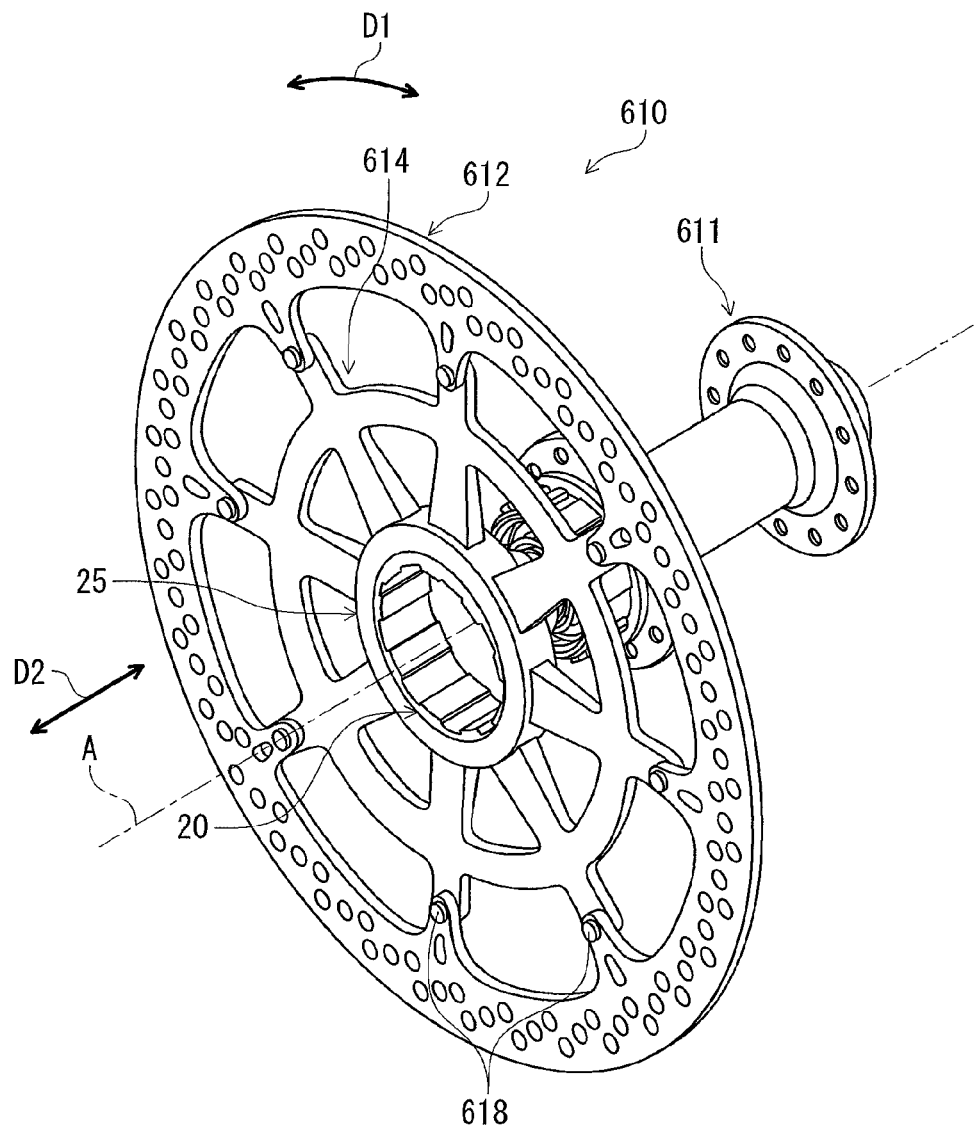
FIG. 18 is a perspective view of a rotatable annular bicycle component in accordance with a sixth embodiment.

As seen in FIG. 18, the rotatable annular bicycle component 610 comprises an outer annular member 612, an intermediate supporting member 614, and the hub engaging member 20. In the illustrated embodiment, the outer annular member 612 includes a disc rotor body of a bicycle disc brake system. The outer annular member 612 is attached to the intermediate supporting member 614. The outer annular member 612 is coupled to the intermediate supporting member 614 using fasteners 618 (e.g., rivets). The outer annular member 612 comprises a first material. The intermediate supporting member 614 comprises a second material different from the first material. The hub engaging member 20 is configured to be attached to the intermediate supporting member 614 and is configured to engage with a bicycle hub assembly 611. The hub engaging member 20 comprises a third material different from the second material.

In the illustrated embodiment, the intermediate supporting member 614 is made of a resin material such as fiber reinforced plastic, and the hub engaging member 20 is made of a metallic material such as aluminum, iron or titanium. Preferably, the intermediate supporting member 614 is integrally formed with the hub engaging member 20 by an integral molding process. For example, the intermediate supporting member 614 is integrally formed with the hub engaging member 20 by an insert molding process as well as the first embodiment.

With the rotatable annular bicycle component 610, the second material of the intermediate supporting member 614 is different from the first material of the outer annular member 612, and the third material of the hub engaging member 20 is different from the second material of the intermediate supporting member 614. Accordingly, weight and/or rigidity of the rotatable annular bicycle component 610 can be adjusted by changing the first material, the second material and the third material.

Seventh Embodiment

A rotatable annular bicycle component 710 in accordance with a seventh embodiment will be described below referring to FIGS. 19 to 22. The rotatable annular bicycle component 710 has substantially the same configuration as the rotatable annular bicycle component 10 except for the arrangement of coupling portions of the outer annular member and the intermediate supporting member. Thus, elements having substantially the same function as those in the above embodiments will be numbered the same here, and will not be described again in detail here for the sake of brevity.

Figure 19:
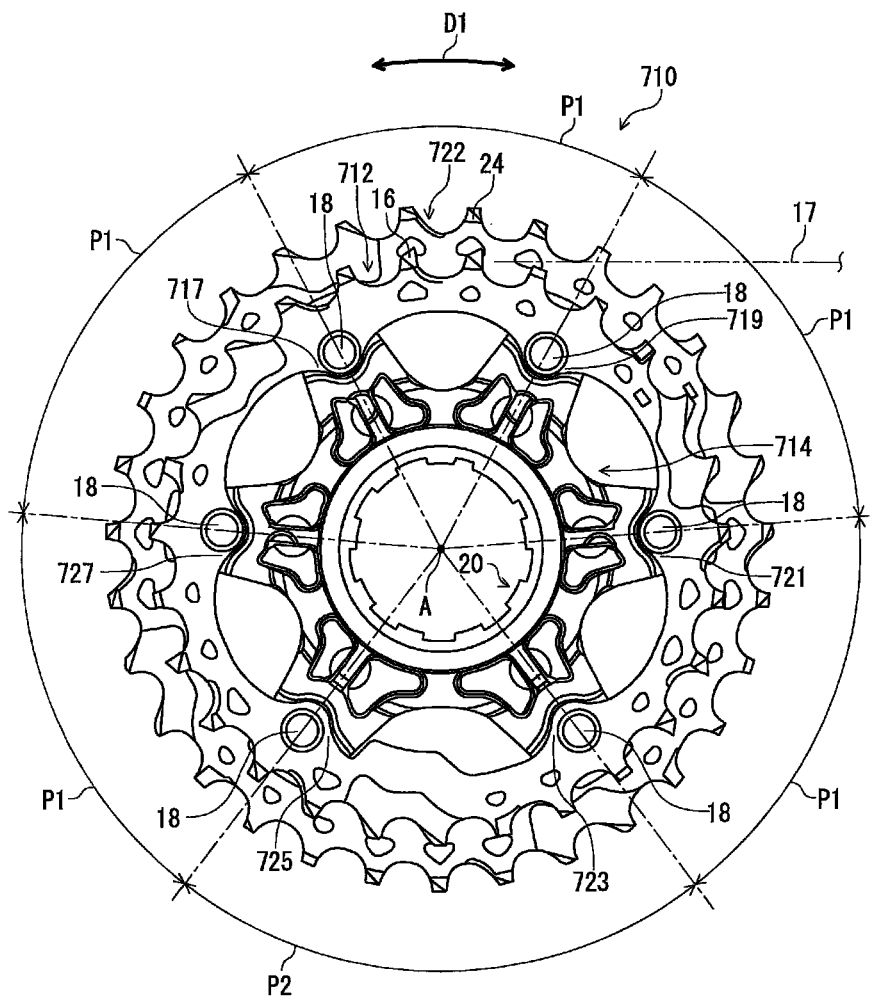
FIG. 19 is an outside elevational view of a rotatable annular bicycle component in accordance with a seventh embodiment.

As seen in FIG. 19, the rotatable annular bicycle component 710 comprises an outer annular member 712 (or a sprocket member) and an intermediate supporting member 714 (or a sprocket supporting member). The rotatable annular bicycle component 710 further comprises the hub engaging member 20 configured to be attached to the intermediate supporting member 714 (or the sprocket supporting member) and configured to engage with the bicycle hub assembly 11 (FIG. 1). The outer annular member 712 (or the sprocket member) comprises the first material. The intermediate supporting member 714 (or the sprocket supporting member) comprises the second material different from the first material. The hub engaging member 20 comprises the third material different from the second material.

Figure 20:
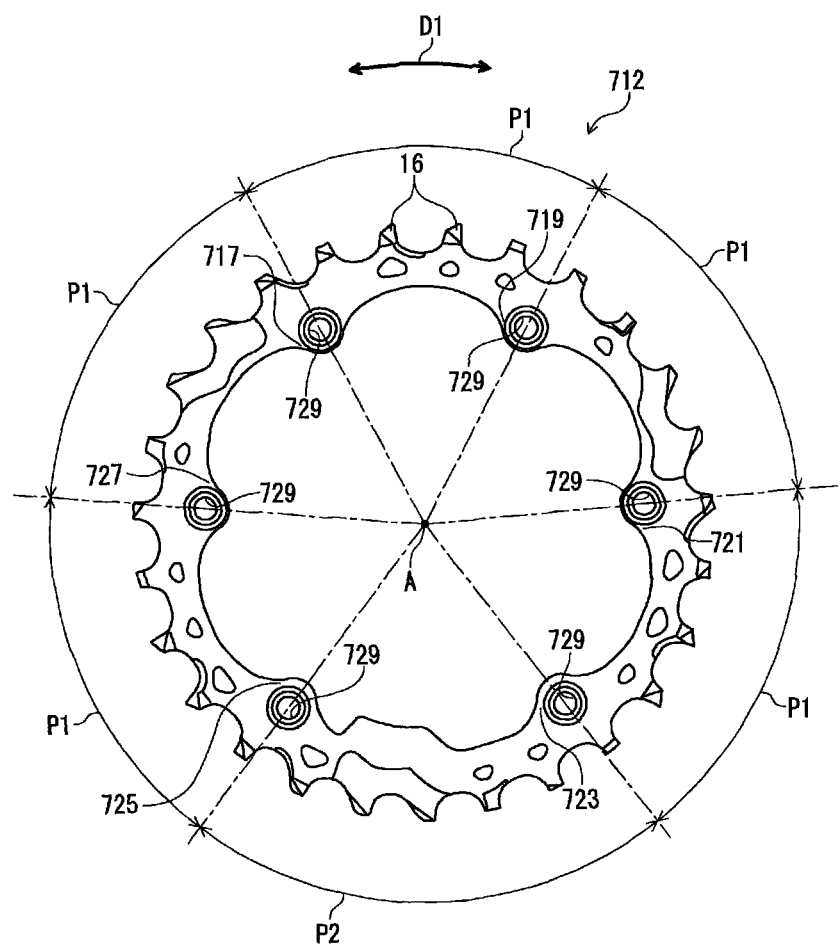
FIG. 20 is an outside elevational view of an outer annular member of the rotatable annular bicycle component illustrated in FIG. 19.

As seen in FIGS. 19 and 20, the outer annular member 712 (or the sprocket member) comprises sprocket teeth 16 and a plurality of coupling portions 717, 719, 721, 723, 725 and 727. The sprocket teeth 16 are configured to engage with the bicycle chain 17. The coupling portions 717, 719, 721, 723, 725 and 727 are arranged in the circumferential direction D1 of the rotatable annular bicycle component 710. The coupling portions 717, 719, 721, 723, 725 and 727 are at least partially arranged in the circumferential direction D1 at an irregular pitch.

More specifically, a pitch P1 is defined each of between the coupling portions 717 and 719, between the coupling portions 719 and 721, between the coupling portions 721 and 723, between the coupling portions 725 and 727, and between the coupling portions 727 and 717. A pitch P2 defined between the coupling portions 723 and 725 is different from the pitch P1. In the illustrated embodiment, the pitch P2 is greater than the pitch P1. As seen in FIG. 20, the pitches P1 and P2 are defined based on centers of fastening holes 729 of the outer annular member 712. The fastening holes 729 are respectively provided on the coupling portions 717, 719, 721, 723, 725 and 727. The fasteners 18 respectively extend through the fastening holes 729.

Figure 21:
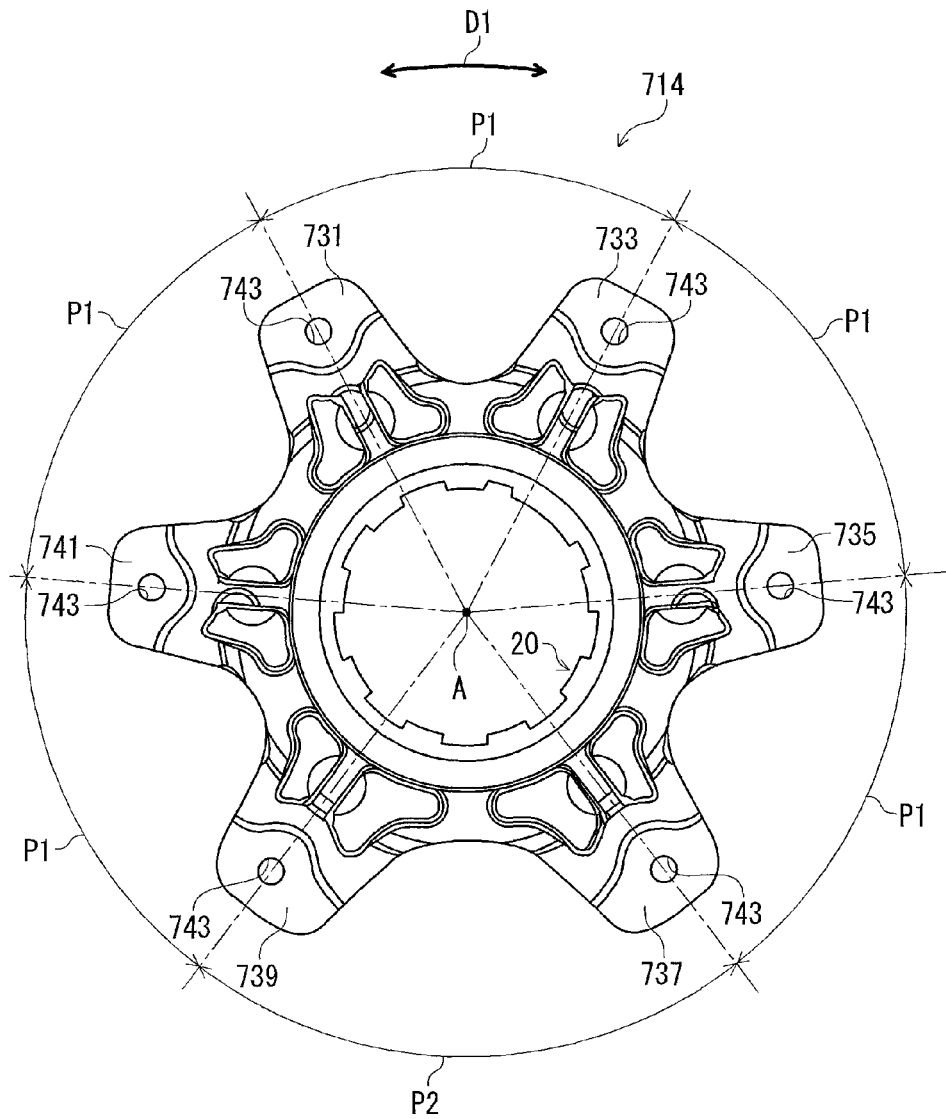
FIG. 21 is an outside elevational view of an intermediate supporting member of the rotatable annular bicycle component illustrated in FIG. 19.

As seen in FIG. 21, the intermediate supporting member 714 (or the sprocket supporting member) includes sprocket attachment parts 731, 733, 735, 737, 739 and 741 to which the coupling portions 717, 719, 721, 723, 725 and 727 are respectively attached. The sprocket attachment parts are at least partially arranged in the circumferential direction at an irregular pitch.

More specifically, the pitch P1 is defined each of between the sprocket attachment parts 731 and 733, between the sprocket attachment parts 733 and 735, between the sprocket attachment parts 735 and 737, between the sprocket attachment parts 739 and 741, and between the sprocket attachment parts 741 and 731. The pitch P2 defined between the sprocket attachment parts 737 and 739 is different from the pitch P1. In the illustrated embodiment, the pitch P2 is greater than the pitch P1. The pitches P1 and P2 are defined based on centers of fastening holes 743 of the intermediate supporting member 714. The fastening holes 743 are respectively provided on the sprocket attachment parts 731, 733, 735, 737, 739 and 741. The fasteners 18 respectively extend through the fastening holes 743.

Figure 22:
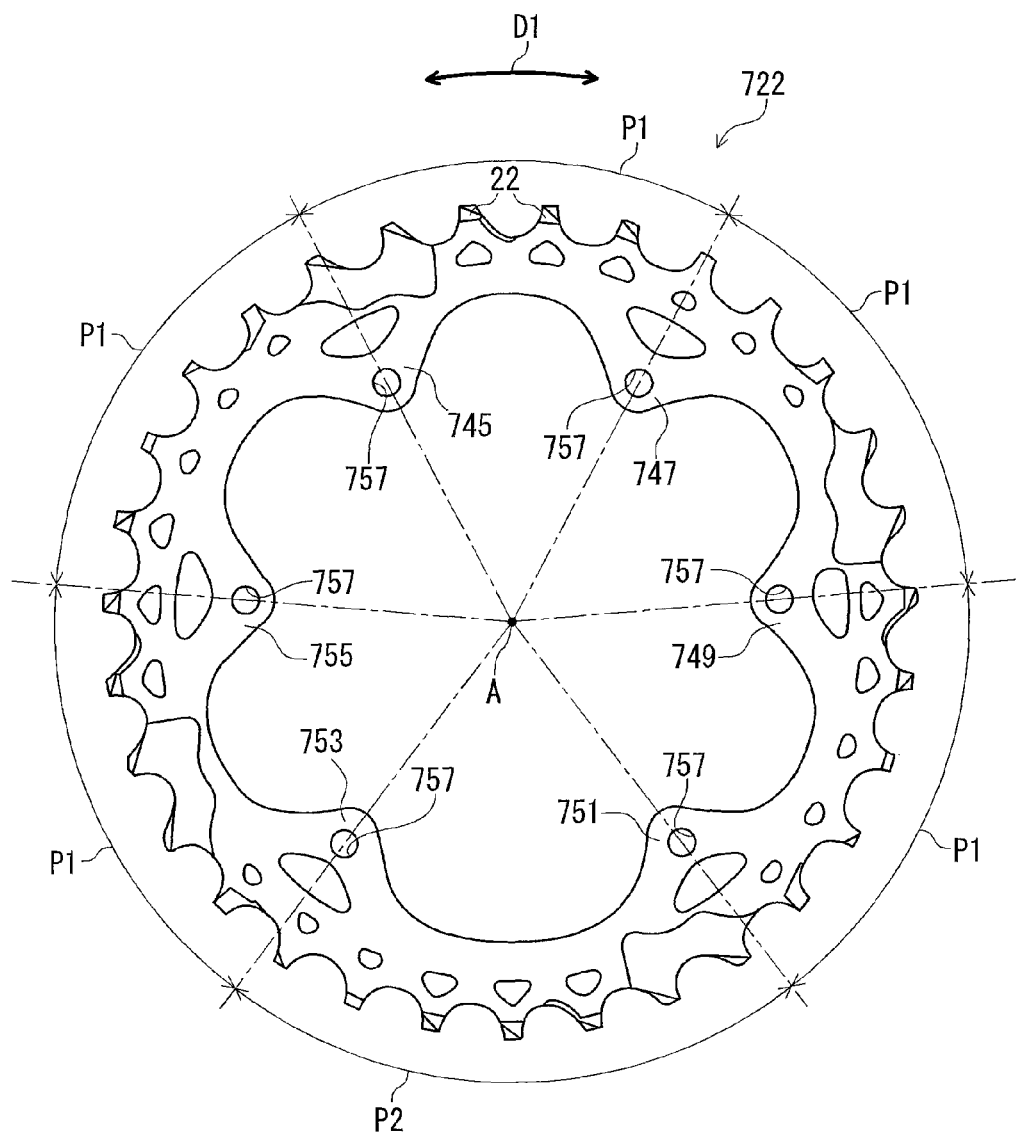
FIG. 22 is an outside elevational view of an outer annular member of the rotatable annular bicycle component illustrated in FIG. 19.

As seen in FIG. 22, the rotatable annular bicycle component 710 further comprises an outer annular member 722 (or the sprocket member). The outer annular member 722 (or the sprocket member) comprises the first material. The outer annular member 722 (or the sprocket member) comprises the sprocket teeth 24 and a plurality of coupling portions 745, 747, 749, 751, 753 and 755. The sprocket teeth 24 are configured to engage with the bicycle chain 17. The coupling portions 745, 747, 749, 751, 753 and 755 are arranged in the circumferential direction D1 of the rotatable annular bicycle component 710. The coupling portions 745, 747, 749, 751, 753 and 755 are at least partially arranged in the circumferential direction D1 at an irregular pitch.

More specifically, the pitch P1 is defined each of between the coupling portions 745 and 747, between the coupling portions 747 and 749, between the coupling portions 749 and 751, between the coupling portions 753 and 755, and between the coupling portions 755 and 745. The pitch P2 defined between the coupling portions 751 and 753 is difference from the pitch P1. In the illustrated embodiment, the pitch P2 is greater than the pitch P1. The pitches P1 and P2 are defined based on centers of fastening holes 757 of the outer annular member 722. The fastening holes 757 are respectively provided on the coupling portions 745, 747, 749, 751, 753 and 755. The fasteners 18 respectively extend through the fastening holes 757. According to the seventh embodiment, because the coupling portions of the sprocket member are at least partially arranged in the circumferential direction at an irregular pitch, it is possible to obtain another relatively large sprocket besides a sprocket from a common metallic plate material in a punching process.

It will be apparent to those skilled in the bicycle field from the present disclosure that the structures of the rotatable annular bicycle components in accordance with the first to fifth and seventh embodiments can be applied to disc rotors if needed and/or desired.

In the above embodiments, the term "attached" or "attaching", as used herein, encompasses configurations in which an element is directly attached to another element by affixing the element directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers such as the term "first" or "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A rotatable annular bicycle component comprising:
   an outer annular member comprising a first material;
   an intermediate supporting member to which the outer annular member is attached, the intermediate supporting member comprising a second material different from the first material; and
   a hub engaging member configured to be attached to the intermediate supporting member and configured to engage with a bicycle hub assembly, the hub engaging member comprising a third material different from the second material, the hub engaging member including
      an inner engaging part configured to engage with the bicycle hub assembly, and an outer engaging part configured to engage with the intermediate supporting member, the outer engaging part being integrally provided with the inner engaging part as a one-piece unitary member and being at least partly embedded in the intermediate supporting member.

2. The rotatable annular bicycle component according to claim 1, wherein
the outer annular member includes sprocket teeth configured to engage with a bicycle chain.

3. The rotatable annular bicycle component according to claim 2, further comprising:
at least one additional outer annular member including sprocket teeth configured to engage with a bicycle chain, wherein
the at least one additional outer annular member is attached to the intermediate supporting member.

4. The rotatable annular bicycle component according to claim 1, wherein
the hub engaging member includes an annular main-body provided about a rotational center axis of the rotatable annular bicycle component, and
the inner engaging part is provided on an inner peripheral part of the annular main-body and includes a first concavo-convex structure configured to engage with a concavo-convex structure of the bicycle hub assembly.

5. The rotatable annular bicycle component according to claim 4, wherein
the outer engaging part is provided on an outer peripheral part of the annular main-body and includes a second concavo-convex structure configured to engage with the intermediate supporting member.

6. The rotatable annular bicycle component according to claim 5, wherein
the intermediate supporting member includes a third concavo-convex structure configured to engage with the second concavo-convex structure of the hub engaging member.

7. The rotatable annular bicycle component according to claim 1, wherein
the first material comprises a metallic material,
the second material comprises a non-metallic material, and
the third material comprises a metallic material.

8. The rotatable annular bicycle component according to claim 1, wherein
the second material comprises a resin material.

9. The rotatable annular bicycle component according to claim 1, wherein
the second material comprises fiber reinforced plastic.

10. The rotatable annular bicycle component according to claim 1, wherein
the third material comprises one of aluminum, iron and titanium.

11. The rotatable annular bicycle component according to claim 1, wherein
the first material comprises one of iron and titanium.

12. The rotatable annular bicycle component according to claim 1, wherein
the outer annular member has a multi-layered structure with different materials.

13. The rotatable annular bicycle component according to claim 12, wherein
the outer annular member includes
a first sprocket layer comprising the first material,
a second sprocket layer comprising a fourth material, and
a third sprocket layer comprising a fifth material and provided between the first sprocket layer and the second sprocket layer,
the first material comprises a metallic material,
the fourth material comprises a metallic material, and
the fifth material comprises a non-metallic material.

14. The rotatable annular bicycle component according to claim 13, wherein
the fifth material comprises a resin material.

15. The rotatable annular bicycle component according to claim 14, wherein
the second material and the fifth material comprise the resin material, and
the first sprocket layer, the second sprocket layer and the third sprocket layer are integrally formed with the intermediate supporting member.

16. The rotatable annular bicycle component according to claim 15, wherein
the first sprocket layer, the second sprocket layer and the third sprocket layer are integrally formed with the intermediate supporting member by an integral molding process.

17. The rotatable annular bicycle component according to claim 13, further comprising:
an additional outer annular member including sprocket teeth configured to engage with a bicycle chain, wherein
the additional outer annular member has a multi-layered structure with different materials and includes
a fourth sprocket layer comprising a metallic material,
a fifth sprocket layer comprising a metallic material and
a sixth sprocket layer comprising a non-metallic material and provided between the fourth sprocket layer and the fifth sprocket layer, and
the fourth sprocket layer is joined to the first sprocket layer by defused joining.

18. The rotatable annular bicycle component according to claim 12, wherein
the outer annular member includes
a first sprocket layer comprising the first material,
a second sprocket layer comprising a fourth material, and
a third sprocket layer comprising a fifth material and provided between the first sprocket layer and the second sprocket layer,
the first sprocket layer is bonded to the third sprocket layer with adhesive, and
the second sprocket layer is bonded to the third sprocket layer with adhesive.

19. The rotatable annular bicycle component according to claim 12, wherein
the outer annular member includes
a first sprocket layer comprising the first material,
a second sprocket layer comprising a fourth material, and
a third sprocket layer comprising a fifth material and provided between the first sprocket layer and the second sprocket layer,
each of the first material, the fourth material and the fifth material comprise a metallic material,
the first sprocket layer is joined to the third sprocket layer by defused joining, and
the second sprocket layer is joined to the third sprocket layer by defused joining.

20. The rotatable annular bicycle component according to claim 1, wherein
the intermediate supporting member includes a weight-saving opening.

21. The rotatable annular bicycle component according to claim 1, wherein
the intermediate supporting member includes an annular base portion having an opening, and
the hub engaging member is provided in the opening of the annular base portion.

22. The rotatable annular bicycle component according to claim 21, wherein
the outer engaging part of the hub engaging member is at least partly embedded in an inner peripheral part of the annular base portion.

23. The rotatable annular bicycle component according to claim 22, wherein
the inner engaging part includes a first concavo-convex structure configured to engage with a concavo-convex structure of the bicycle hub assembly, and
the outer engaging part includes a second concavo-convex structure configured to engage with the inner peripheral part of the annular base portion.

24. The rotatable annular bicycle component according to claim 23, wherein
the intermediate supporting member includes a third concavo-convex structure configured to engage with the second concavo-convex structure of the hub engaging member, and
the third concavo-convex structure is provided on the inner peripheral part of the annular base portion.

25. The rotatable annular bicycle component according to claim 24, wherein
the second concavo-convex structure includes first protrusions arranged in a circumferential direction of the rotatable annular bicycle component,
the third concavo-convex structure includes second protrusions arranged in the circumferential direction, and
the second protrusions mesh with the first protrusions of the second concavo-convex structure.

26. A rotatable annular bicycle component comprising:
an outer annular member comprising a first material;
an intermediate supporting member to which the outer annular member is attached, the intermediate supporting member comprising a second material different from the first material; and
a hub engaging member configured to be attached to the intermediate supporting member and configured to engage with a bicycle hub assembly, the hub engaging member comprising a third material different from the second material, wherein
the intermediate supporting member includes a weight-saving opening, and
the intermediate supporting member includes a reinforcing rib at least partly overlapping with the weight-saving opening when viewed from an axial direction parallel to a rotational center axis of the rotatable annular bicycle component.

27. The rotatable annular bicycle component according to claim 26, wherein
the reinforcing rib is at least partly provided outside the weight-saving opening in the axial direction.

28. The rotatable annular bicycle component according to claim 1, wherein
the rotatable annular bicycle component comprises a disc rotor.

29. A bicycle rear sprocket comprising:
a sprocket member including sprocket teeth configured to engage with a bicycle chain; and
a sprocket supporting member to which the sprocket member is attached, the sprocket supporting member comprising:
a weight-saving opening offset from a rotational center axis of the bicycle rear sprocket; and
a reinforcing rib at least partly overlapping with the weight-saving opening when viewed from an axial direction parallel to the rotational center axis of the bicycle rear sprocket.

30. The bicycle rear sprocket according to claim 29, wherein
the reinforcing rib is at least partly provided outside the weight-saving opening in the axial direction.

31. The bicycle rear sprocket according to claim 29, wherein
the reinforcing rib is entirely provided outside the weight-saving opening in the axial direction.

32. The bicycle rear sprocket according to claim 29, wherein
the sprocket member comprises a first material,
the sprocket supporting member comprises a second material,
the first material comprises a metallic material, and
the second material comprises a non-metallic material.

33. The bicycle rear sprocket according to claim 32, wherein
the second material comprises a resin material.

34. The bicycle rear sprocket according to claim 32, wherein
the second material comprises fiber reinforced plastic.

35. The bicycle rear sprocket according to claim 29, wherein
the sprocket member has a multi-layered structure with different materials.

36. The bicycle rear sprocket according to claim 29, wherein
the sprocket supporting member comprises a supporting base part,
the weight-saving opening is provided on the supporting base part, and
the reinforcing rib is provided on the supporting base part and is integrally provided with the supporting base part as a one-piece unitary member.

37. The bicycle rear sprocket according to claim 29, wherein
the reinforcing rib extends across the weight-saving opening to pass through a center of the weight-saving opening when viewed from the axial direction.

38. A bicycle rear sprocket comprising:
a sprocket member including sprocket teeth configured to engage with a bicycle chain;
a sprocket supporting member to which the sprocket member is attached, the sprocket supporting member comprising:
a weight-saving opening; and
a reinforcing rib at least partly overlapping with the weight-saving opening when viewed from an axial direction parallel to a rotational center axis of the bicycle rear sprocket; and
a hub engaging member configured to be attached to the sprocket supporting member and configured to engage with a bicycle hub assembly, wherein
the hub engaging member comprises a third material, and
the third material comprises a metallic material.

39. The bicycle rear sprocket according to claim 38, wherein the third material comprises one of aluminum, iron, and titanium.

40. The bicycle rear sprocket according to claim 38, wherein the hub engaging member includes
an annular main-body provided about the rotational center axis of the bicycle rear sprocket, and
an inner engaging part provided on an inner peripheral part of the annular main-body and including a first concavo-convex structure configured to engage with a concavo-convex structure of an bicycle hub assembly.

41. The bicycle rear sprocket according to claim 38, wherein the hub engaging member includes an outer engaging part provided on an outer peripheral part of the annular main-body and including a second concavo-convex structure configured to engage with the sprocket supporting member.

42. A rotatable annular bicycle component comprising:
a sprocket member comprising:
sprocket teeth configured to engage with a bicycle chain; and
a plurality of coupling portions arranged in a circumferential direction of the rotatable annular bicycle component, the coupling portions being at least partially arranged in the circumferential direction at an irregular pitch; and
a sprocket supporting member including sprocket attachment parts to which the coupling portions are respectively attached.

43. The rotatable annular bicycle component according to claim 42, wherein
the sprocket attachment parts are at least partially arranged in the circumferential direction at an irregular pitch.

44. The rotatable annular bicycle component according to claim 42, further comprising:
a hub engaging member configured to be attached to the sprocket supporting member and configured to engage with a bicycle hub assembly, wherein
the sprocket member comprises a first material,
the sprocket supporting member comprises a second material different from the first material, and
the hub engaging member comprises a third material different from the second material.

* * * * *